United States Patent
Sugihara et al.

(10) Patent No.: US 10,336,859 B2
(45) Date of Patent: Jul. 2, 2019

(54) METHOD FOR PREPARING AN ELECTROLYTE CAPACITOR

(71) Applicant: TAYCA CORPORATION, Osaka-shi, Osaka (JP)

(72) Inventors: Ryosuke Sugihara, Osaka (JP); Taichi Yamaguchi, Osaka (JP); Yuhei Tsurumoto, Suita (JP)

(73) Assignee: TAYCA CORPORATION, Osaka-shi, Osaka (JP)

( * ) Notice: Subject to any disclaimer, the term of this patent is extended or adjusted under 35 U.S.C. 154(b) by 0 days.

(21) Appl. No.: 16/214,184

(22) Filed: Dec. 10, 2018

(65) Prior Publication Data

US 2019/0106531 A1   Apr. 11, 2019

Related U.S. Application Data

(63) Continuation of application No. 15/120,815, filed as application No. PCT/JP2015/054343 on Feb. 18, 2015.

(30) Foreign Application Priority Data

Feb. 27, 2014  (JP) .................................. 2014-036103
Oct. 15, 2014  (JP) .................................. 2014-210370

(51) Int. Cl.
| | | |
|---|---|---|
| *C08G 61/12* | (2006.01) | |
| *H01G 9/028* | (2006.01) | |
| *H01G 9/00* | (2006.01) | |
| *H01G 9/15* | (2006.01) | |
| *H01B 1/12* | (2006.01) | |

(52) U.S. Cl.
CPC ........... *C08G 61/126* (2013.01); *H01B 1/127* (2013.01); *H01G 9/0036* (2013.01); *H01G 9/028* (2013.01); *H01G 9/15* (2013.01); *C08G 2261/12* (2013.01); *C08G 2261/1424* (2013.01); *C08G 2261/3221* (2013.01); *C08G 2261/3223* (2013.01); *C08G 2261/43* (2013.01); *C08G 2261/51* (2013.01)

(58) Field of Classification Search
CPC .............................. C08G 61/126; H01B 1/127
See application file for complete search history.

(56) References Cited

U.S. PATENT DOCUMENTS

| | | | |
|---|---|---|---|
| 2011/0175034 A1 | 7/2011 | Suh et al. | |
| 2012/0165488 A1 | 6/2012 | Sugihara et al. | |

FOREIGN PATENT DOCUMENTS

| | | |
|---|---|---|
| JP | 11-302305 A | 11/1999 |
| JP | 2003-160647 A | 6/2003 |
| JP | 2004-265927 A | 9/2004 |
| JP | 2008-172277 A | 7/2008 |
| JP | 2011-527712 A | 11/2011 |
| WO | 2012/023221 A1 | 2/2012 |

OTHER PUBLICATIONS

International Search Report dated Apr. 21, 2015, issued in counterpart International Application No. PCT/JP2015/054353.
Decision to Grant a Patent dated Jul. 28, 2015, issued in counterpart Japanese Patent Application No. 2015-522815.
Non-Final Office Action dated Mar. 3, 2017, issued in U.S. Appl. No. 15/120,815.
Non-Final Office Action dated Jul. 5, 2018, issued in U.S. Appl. No. 15/120,815.

*Primary Examiner* — Peter F Godenschwager
(74) *Attorney, Agent, or Firm* — Westerman, Hattori, Daniels & Adrian, LLP

(57) ABSTRACT

The method for preparing an electrolyte capacitor includes: providing an oxidant dopant agent for preparing the conductive polymer including: ferric naphthalenesulfonate; and at least one compound selected from the group consisting of phosphate, phosphite, borate, thiophosphate, and dithiophosphate. The method also includes preparing a conductive polymer by using the oxidant dopant agent to obtain an electrolyte comprising the conductive polymer.

11 Claims, No Drawings

METHOD FOR PREPARING AN ELECTROLYTE CAPACITOR

CROSS-REFERENCE TO RELATED APPLICATIONS

This application is a Continuation of U.S. patent application Ser. No. 15/120,815, filed on Aug. 23, 2016, which is a § 371 National Stage Application of PCT International Application No. PCT/JP2015/054353 filed on Feb. 18, 2015 which claims the benefits of priority from the prior Japanese Patent Application No. 2014-210370 filed on Oct. 15, 2014, and No. 2014-036103 filed on Feb. 27, 2014.

TECHNICAL FIELD

The present invention relates to an oxidant dopant agent for conductive polymer production, and a solution thereof. The present invention also relates to a conductive polymer prepared by using either of them, as well as an electrolyte capacitor using the conductive polymer as an electrolyte.

BACKGROUND OF THE INVENTION

Having a high conductivity, conductive polymers have been used as an electrolyte in aluminum electrolyte capacitors, tantalum electrolyte capacitors, niobium electrolyte capacitors, and etc.

The conductive polymers used in such an application can be obtained by means of chemical oxidation polymerization or electrolytic oxidation polymerization of, for example, thiophene or its derivatives.

As a dopant, an organic sulfonic acid can be mainly used to carry out a chemical oxidation polymerization of thiophene or its derivative as mentioned above. As an oxidant, a transition metal can be used. In particular, it is said that a ferric compound is suitable. Usually, a ferric salt of an organic sulfonic acid can be used to serve as an oxidant dopant agent in carrying out the chemical oxidation polymerization of thiophene or its derivative. (Patent Reference No. 1 and Patent Reference No. 2.)

However, in case of using ferric salts of organic sulfonic acids as an oxidant dopant agent to prepare a conductive polymer, thereby obtained electrolyte capacitors using it have been involved in large amounts of leak current. In particular, such problem of large amounts of leak current could become significant especially in a condition of a high temperature.

PRIOR ART REFERENCES

Patent References

Patent Reference No. 1: Japanese Laid-Open Patent Publication No. 2003-160647;
Patent Reference No. 2: Japanese Laid-Open Patent Publication No. 2004-265927

SUMMARY OF THE INVENTION

The Objectives to Solve by the Invention

Therefore, the present invention relates to an oxidant dopant agent for conductive polymer production, and a solution thereof. They are capable of producing a conductive polymer suitable for producing an electrolyte capacitor having a low leak current. In addition, the present invention relates to a conductive polymer prepared by using either of the oxidant dopant agent or the solution thereof, in which the conductive polymer is suitable for producing an electrolyte capacitor having a low leak current. Also, the present invention relates to an electrolyte capacitor using the conductive polymer as an electrolyte, in which the electrolyte capacitor has a low leak current.

Means to Solve the Problem

As a result of zealous study to solve the problems as discussed above, the present invention has been accomplished based on the finding that the problems above can be solved by using an oxidant dopant agent prepared from an organic ferric sulfonate and a special additive such as a phosphoric acid type additive, a phosphorous acid type additive, a boric acid type additive, a thiophosphoric acid type additive or a dithiophosphoric acid type additive.

That is, the present invention relates to an oxidant dopant agent for preparing a conductive polymer, comprising: an organic ferric sulfonate; and at least one kind selected from the group consisting of phosphoric acid, phosphate, phosphorous acid, phosphite, boric acid, borate, thiophosphoric acid, thiophosphate, dithiophosphoric acid and dithiophosphate.

In addition, when adding a glycidyl group containing compound or its ring-opening compound into the oxidant dopant agent for conductive polymer preparation as mentioned above, an electrolyte capacitor can be prepared while giving it not only a characteristic of a low leak current, but a characteristic of a high breakdown voltage (i.e., it is also excellent in the withstanding voltage property). Therefore, the scope of the present invention includes the oxidant dopant agent for conductive polymer preparation as identified above. The scope of the present invention also encompasses an oxidant dopant agent for preparing a conductive polymer which further includes a glycidyl group containing compound or its ring-opening compound. Furthermore, the scope of the present invention can encompass a solution of the oxidant dopant agent for conductive polymer preparation solution in which the oxidant dopant agent for conductive polymer preparation is dissolved in water, an alcohol or a mixture with water and the alcohol. The scope of the present invention can also encompass a conductive polymer prepared by means of oxidation polymerization of a monomer such as thiophene or its derivative by using the oxidant dopant agent for conductive polymer preparation, or the solution thereof. The scope of the present invention can also encompass an electrolyte capacitor using the conductive polymer as an electrolyte.

Effects of the Invention

According to the present invention, there can be provided an oxidant dopant agent for conductive polymer preparation, and a solution thereof. These are capable of producing a conductive polymer suitable for producing an electrolyte capacitor having a low leak current.

Also, according to the present invention, by using the oxidant dopant agent for conductive polymer preparation, or the solution thereof, there can be provided a conductive polymer which is suitable for producing an electrolyte capacitor having a low leak current.

In addition, by using the conductive polymer, there can be provided an electrolyte capacitor having a low leak current.

Embodiments to Carry Out the Invention

As explained before, the oxidant dopant agent for conductive polymer preparation of the present invention can be constituted by including an organic ferric sulfonate; and at least one kind selected from the group consisting of phosphoric acid, phosphate, phosphorous acid, phosphite, boric acid, borate, thiophosphoric acid, thiophosphate, dithiophosphoric acid and dithiophosphate. Here, the organic ferric sulfonate can includes compounds which have been used in this field, and a large number of compounds are available for use. Therefore, its partner, that is, the specific acid or an acid ester component, will be explained first.

The acid or an acid ester component can include at least one kind selected from the group consisting of phosphoric acid, phosphate, phosphorous acid, phosphite, boric acid, borate, thiophosphoric acid, thiophosphate, dithiophosphoric acid and dithiophosphate. The phosphate above can include methyl phosphate, dimethyl phosphate, trimethyl phosphate, ethyl phosphate, diethyl phosphate, triethyl phosphate, propyl phosphate, dipropyl phosphate, tripropyl phosphate, butyl phosphate, dibutyl phosphate, tributyl phosphate, ethylhexyl phosphate, diethylhexyl phosphate, triethylhexyl phosphate, benzyl phosphate, dibenzyl phosphate, tribenzyl phosphate, phenyl phosphate, diphenyl phosphate, triphenyl phosphate, trisethoxydiglycol phosphate, polyperfluoroethoxymethoxydifluoroethylpolyethyleneglycol phosphate, dimethyl-2-(glycidyloxy)ethyl phosphate, hexyl phosphate, dihexyl phosphate, trihexyl phosphate, octyl phosphate, dioctyl phosphate, trioctyl phosphate, decyl phosphate, didecyl phosphate, tridecyl phosphate, dodecyl phosphate, didodecyl phosphate, tridodecyl phosphate, acrylic phosphate, diacrylic phosphate, triacrylic phosphate, methacryl phosphate, dimethacryl phosphate, trimethacryl phosphate, phosphorus acid hydroxyethyl methacrylate, phosphorus acid dihydroxyethyl methacrylate, and phosphorus acid trihydroxyethyl methacrylate. Among the phosphates above, particularly favorable are a dialkyl phosphate such as dimethyl phosphate, diethyl phosphate, dipropyl phosphate, dibutyl phosphate; a diester phosphate such as dibenzyl phosphate and diphenyl phosphate; and a triester phosphate such as tributyl phosphate.

The phosphite above can include methyl phosphite, dimethyl phosphite, trimethyl phosphite, ethyl phosphite, diethyl phosphite, triethyl phosphite, propyl phosphite, dipropyl phosphite, tripropyl phosphite, butyl phosphite, dibutyl phosphite, tributyl phosphite, ethylhexyl phosphite, diethylhexyl phosphite, triethylhexyl phosphite, benzyl phosphite, dibenzyl phosphite, tribenzyl phosphite, phenyl phosphite, diphenyl phosphite, triphenyl phosphite, trisethoxydiglycol phosphite, dimethyl-2-(glycidyloxy)ethyl phosphite, hexyl phosphite, dihexyl phosphite, trihexyl phosphite, octyl phosphite, dioctyl phosphite, trioctyl phosphite, decyl phosphite, didecyl phosphite, tridecyl phosphite, dodecyl phosphite, didodecyl phosphite, tridodecyl phosphite, acrylic phosphite, diacrylic phosphite, triacrylic phosphite, methacryl phosphite, dimethacryl phosphite, trimethacryl phosphite, phosphorous acid hydroxyethyl methacrylate, phosphorous acid dihydroxyethyl methacrylate, and phosphorous acid trihydroxyethyl methacrylate. Among the phosphites above, particularly preferable are, for example, a dialkyl phosphite such as dimethyl phosphite, diethyl phosphite, dipropyl phosphite, dibutyl phosphite, and diethylhexyl phosphite; a diester phosphite such as dibenzyl phosphite and diphenyl phosphite; and a triester phosphite such as tributyl phosphite.

The borate as mentioned above can include, for example, methyl borate, dimethyl borate, trimethyl borate, ethyl borate, diethyl borate, triethyl borate, propyl borate, dipropyl borate, tripropyl borate, butyl borate, dibutyl borate, tributyl borate, ethylhexyl borate, diethylhexyl borate, triethylhexyl borate, benzyl borate, dibenzyl borate, tribenzyl borate, phenyl borate, diphenyl borate, triphenyl borate, hexyl borate, dihexyl borate, trihexyl borate, octyl borate, dioctyl borate, trioctyl borate, decyl borate, didecyl borate, tridecyl borate, dodecyl borate, didodecyl borate, tridodecyl borate, acrylic borate, diacrylic borate, triacrylic borate, methacryl borate, dimethacryl borate, and trimethacryl borate. Among the borates above, particularly preferable are a dialkyl borate such as dimethyl borate, diethyl borate, dibutyl borate, and diethylhexyl borate; a diester borate such as dibenzyl borate and diphenyl borate; and a triester borate such as tributyl borate.

The thiophosphate above can include methyl thiophosphate, dimethyl thiophosphate, trimethyl thiophosphate, ethyl thiophosphate, diethyl thiophosphate, triethyl thiophosphate, propyl thiophosphate, dipropyl thiophosphate, tripropyl thiophosphate, butyl thiophosphate, dibutyl thiophosphate, tributyl thiophosphate, hexyl thiophosphate, dihexyl thiophosphate, trihexyl thiophosphate, octyl thiophosphate, dioctyl thiophosphate, trioctyl thiophosphate, ethylhexyl thiophosphate, diethylhexylthiophosphate, triethylhexyl thiophosphate, benzyl thiophosphate, dibenzyl thiophosphate, tribenzyl thiophosphate, phenyl thiophosphate, diphenyl thiophosphate, triphenyl thiophosphate, decyl thiophosphate, didecyl thiophosphate, tridecyl thiophosphate, dodecyl thiophosphate, didodecyl thiophosphate, and tridodecyl thiophosphate. Among the thiophosphates above, particularly preferable are for example, a dialkyl thiophosphate such as dimethyl thiophosphate, diethyl thiophosphate, dipropyl thiophosphate, dibutyl thiophosphate, and diethylhexyl thiophosphate; a diester thiophosphate such as dibenzyl thiophosphate and diphenyl thiophosphate; and a triester thiophosphate such as tributyl thiophosphate.

The dithiophosphate above can include methyl dithiophosphate, dimethyl dithiophosphate, trimethyl dithiophosphate, ethyl dithiophosphate, diethyl dithiophosphate, triethyl dithiophosphate, propyl dithiophosphate, dipropyl dithiophosphate, tripropyl dithiophosphate, butyl dithiophosphate, dibutyl dithiophosphate, tributyl dithiophosphate, hexyl dithiophosphate, dihexyl dithiophosphate, trihexyl dithiophosphate, octyl dithiophosphate, dioctyl dithiophosphate, trioctyl dithiophosphate, ethylhexyl dithiophosphate, diethylhexyl dithiophosphate, triethylhexyl dithiophosphate, benzyl dithiophosphate, dibenzyl dithiophosphate, tribenzyl dithiophosphate, phenyl dithiophosphate, diphenyl dithiophosphate, triphenyl dithiophosphate, decyl dithiophosphate, didecyl dithiophosphate, tridecyl dithiophosphate, dodecyl dithiophosphate, didodecyl dithiophosphate, and tridodecyl dithiophosphate. Among the dithiophosphates above, particularly preferable are, for example, a dialkyl dithiophosphate such as dimethyl dithiophosphate, diethyl dithiophosphate, dipropyl dithiophosphate, dibutyl dithiophosphate, and diethylhexyl dithiophosphate; a diester dithiophosphate such as dibenzyl dithiophosphate and diphenyl dithiophosphate; and a triester dithiophosphate such as tributyl dithiophosphate.

Among these phosphoric acid, phosphate, phosphorous acid, phosphite, boric acid, borate, thiophosphoric acid, thiophosphate, dithiophosphoric acid, dithiophosphate, particularly preferable example include phosphate, phosphite, thiophosphate, and dithiophosphate. Among them, further particularly preferable example includes diester phosphote, diester phosphite, diester thiophosphate, and diester dithiophosphate. In particular, diester phosphate and diester phosphite are preferable.

It is preferable that said at least one kind selected from the group consisting of phosphoric acid, phosphate, phosphorous acid, phosphite, boric acid, borate, thiophosphoric acid, thiophosphate, dithiophosphoric acid and dithiophosphate is contained at an amount of 1 to 100% by mass standard with respect to the organic ferric sulfonate (namely, with respect to 100 parts by mass of the organic ferric sulfonate, said at least one kind selected from the group consisting of phosphoric acid, phosphate, phosphorous acid, phosphite, boric acid, borate, thiophosphoric acid, thiophosphate, dithiophosphoric acid and dithiophosphate is contained at an amount of 1 to 100 parts by mass). When the content of said at least one kind selected from the group consisting of phosphoric acid, phosphate, phosphorous acid, phosphite, boric acid, borate, thiophosphoric acid, thiophosphate, dithiophosphoric acid and dithiophosphate is lower than the range above, the effect to reduce the leak current might not be enough. When the content of said at least one kind selected from the group consisting of phosphoric acid, phosphate, phosphorous acid, phosphite, boric acid, borate, thiophosphoric acid, thiophosphate, dithiophosphoric acid and dithiophosphate is higher than the range above, the ESR might be high, or the characteristic under a high temperature and a high humidity might be deteriorated. In particularly, with respect to the organic ferric sulfonate, said at least one kind selected from the group consisting of phosphoric acid, phosphate, phosphorous acid, phosphite, boric acid, borate, thiophosphoric acid, thiophosphate, dithiophosphoric acid and dithiophosphate is preferably contained at an amount of 1.5% or more by mass standard. More preferably, it is 3% or more. Also, it is preferably 20% or less, and more preferably, it is 15% or less, and yet more preferably it is 10% or less.

By contrast, the organic sulfonic acid for the organic ferric sulfonate can include: for example, an aromatic sulfonic acid such as benzenesulfonic acid or its derivative, naphthalenesulfonic acid or its derivative, and anthraquinonesulfonic acid or its derivative; polymeric sulfonic acid such as polystyrene sulfonic acid, sulfonated polyester, phenolsulfonic acid novolac resin, and a copolymer of styrenesulfonic acid and non-sulfonic acid type monomer as detailed later; and a chain-shaped sulfonic acid such as methanesulfonate ethanesulfonic acid, propanesulfonic acid and butanesulfonic acid.

In particular, the aromatic sulfonic acid is easy to produce electrolyte capacitors having superior capacitor characteristics such as law ESR and high capacitance, and also can be used alone. Therefore, it is preferably used as an organic sulfonic acid to constitute the organic ferric sulfonate. By contrast, the chain-shaped sulfonic acid such as methanesulfonic acid ethanesulfonic acid, propanesulfonic acid and butane sulfonic acid has an acidity higher than the aromatic sulfonic acid, and therefore, it is preferable to be used together with the aromatic sulfonic acid rather than being used alone. In other words, the aromatic sulfonic acid can appropriately cause a reaction at a low humidity (a humidity of approximately less than 35%) to easily produce a conductive polymer with good characteristics, but it has a property that the reaction does not tend to be progressed at a high humidity (a humidity of approximately 50% or more). Therefore, it can be appropriately modified by strong acidity of the chain-shaped sulfonic acid, thereby progressing the reaction.

Regarding the benzenesulfonic acid and its derivative, the examples of the benzenesulfonic acid derivative can include toluenesulfonic acid, ethylbenzenesulfonic acid, propylbenzenesulfonic acid, butylbenzenesulfonic acid, dodecylbenzenesulfonic acid, methoxybenzenesulfonic acid, ethoxybenzenesulfonic acid, propoxybenzenesulfonic acid, butoxybenzenesulfonic acid, phenolsulfonic acid, cresolsulfonic acid, and benzenedisulfonic acid. Regarding the naphthalenesulfonic acid and its derivative, the examples of the naphthalenesulfonic acid derivative can include naphthalenedisulfonic acid, naphthalenetrisulfonic acid, methylnaphthalenesulfonic acid, ethylnaphthalenesulfonic acid, propylnaphthalenesulfonic acid, and butylnaphthalenesulfonic acid. Regarding the anthraquinonesulfonic acid and its derivative, the examples of the anthraquinonesulfonic acid derivative can include anthraquinonedisulfonic acid, and anthraquinonetrisulfonic acid. Among these aromatic sulfonic acids, preferable are toluenesulfonic acid, methoxybenzenesulfonic acid, phenolsulfonic acid, naphthalenesulfonic acid, and naphthalenetrisulfonic acid. Particularly preferable are p-toluenesulfonic acid, methoxybenzenesulfonic acid, and naphthalenesulfonic acid. Specifically, naphthalenesulfonic acid is preferable.

The aromatic sulfonic acid above can be used alone, or in combination of two kinds or more. When two kinds or more are used together, it is preferable that one of the aromatic sulfonic acids is naphthalenesulfonic acid. Favorable example of using two kinds or more can include a combination of naphthalenesulfonic acid and methanesulfonic acid, and a combination of naphthalenesulfonic acid and p-toluenesulfonic acid.

It is preferable that the organic ferric sulfonate has a molar ratio of iron to an organic sulfonic acid, wherein the molar ratio is lower than 1:3 in view of the organic sulfonic acid. Namely, it is to reduce the molar ratio of the sulfonic acid organic below 1:3, that is, the stoichiometric molar ratio of the organic sulfonic acid with respect to iron, thereby slightly reducing the reaction rate of the organic ferric sulfonate. The molar ratio of the organic sulfonic acid with respect to iron is preferably about 1:2 or less. It is further preferably about 1:2.2 or less. Specifically, it is preferably about 1:2.4 or less. Yet specifically, it is preferably about 1:2.75 or less.

The oxidant dopant agent for conductive polymer preparation above can be used as it is, namely in a solid state such as powders. However, in producing the conductive polymer, it is preferable that the oxidant dopant agent for conductive polymer preparation is dissolved in water, an alcohol, or a mixtures of water and an alcohol, so as to be provided as a solution. As a result, the handling property can be improved by making it a solution while the mixture state with monomers can become more homogeneous, thereby showing the function as an oxidant dopant agent more effectively.

As the alcohol to be used as the solvent as mentioned above, the examples can include monovalent alcohol such as methanol (methyl alcohol), ethanol (ethyl alcohol), propanol (propyl alcohol), butanol (butyl alcohol), and polyalcohol such as ethylene glycol, propylene glycol, diethylene glycol, triethylene glycol and polyethylene glycol. Among them, preferable is a monovalent alcohol having a carbon number of 1 to 4, including methanol, ethanol, propanol and butanol.

It is preferable that the concentration of the oxidant dopant agent for conductive polymer preparation (which may be hereinafter simplified as "oxidant dopant agent") is 20 to 70 mass % in the solution of the oxidant dopant agent for conductive polymer preparation. When the concentration of the oxidant dopant agent is lower than 20 mass %, the oxidation power might become weak, and therefore, the polymerization of the monomers might not progress enough. When the concentration of the oxidant dopant agent is higher than 70 mass %, the viscosity might become too high to soak into the capacitor element, and therefore, it might become difficult to produce capacitors. In the range of 20 to 70 mass % for the concentration of the oxidant dopant agent in the oxidant dopant agent solution mentioned above, it is more preferably 25 mass % more, and further more preferably 30 mass % or more, and in addition, it is more preferably 65 mass % or less, and further more preferably 60 mass % or less.

The oxidant dopant agent for conductive polymer preparation is constituted by including an organic ferric sulfonate, and at least one kind selected from the group consisting of phosphoric acid, phosphate, phosphorous acid, phosphite, boric acid, borate, thiophosphoric acid, thiophosphate, dithiophosphoric acid and dithiophosphate. As a result, an electrolyte capacitor with low leak current can be provided. Furthermore, a glycidyl group containing compound (in other words, epoxy group) or its ring-opening compound can be added. Then, in addition to the characteristic of low leak current as mentioned above, an electrolyte capacitor further provided with high breakdown voltage (in other words, the withstanding voltage property is superior) can be produced.

The suitable examples of the glycidyl group containing compound can include a monoglycidyl compound represented by general formula (1); a diglycidyl compound represented in general formula (2); a diglycidyl compound represented in general formula (3); glycerin diglycidyl ether, diglycerine tetraglycidyl ether, alcohol-soluble epoxy resin and alcohol-soluble polyglycerin polyglycidyl, and the ring-opening compounds thereof; and epoxy polysiloxane ("polysiloxane" means "a compound having two or more siloxane bonds") and its ring-opening compound.

General Formula (1)

[Chemical Formula 1]

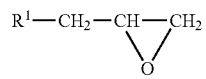

(1)

(In the formula, $R^1$ represents hydroxyl group, an alkyl group having a carbon number of 1 to 5 or an alkoxy group having a carbon number of 1 to 7.)

General Formula (2)

[Chemical Formula 2]

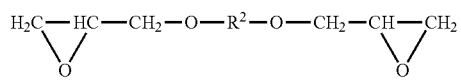

(2)

(In the formula, $R^2$ represents an alkylene group having a carbon number of 2 to 6.)

General Formula (3)

[Chemical Formula 3]

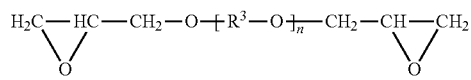

(3)

(In the formula, $R^3$ represents an alkylene group having a carbon number of 2 to 3, and n represents 2 to 20.)

The glycerin diglycidyl ether above is represented by general formula (4).

[Chemical Formula 4]

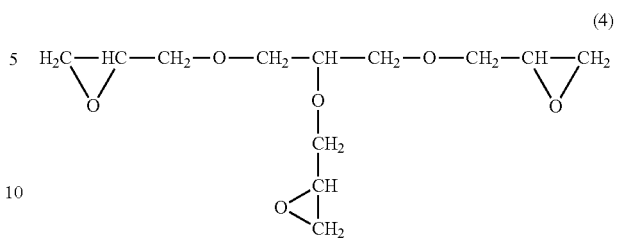

(4)

The diglycerine tetraglycidyl ether above is represented by general formula (5).

[Chemical Formula 5]

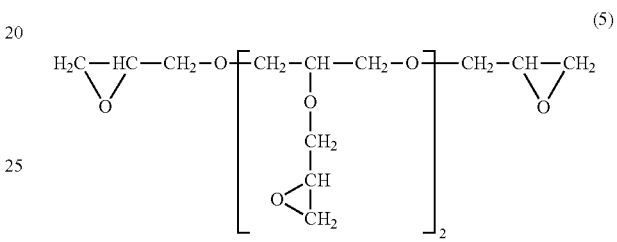

(5)

The ring-opening compounds of the monoglycidyl compound represented by general formula (1), the diglycidyl compound represented in general formula (2), the diglycidyl compound represented in general formula (3), glycerin diglycidyl ether, diglycerine tetraglycidyl ether, and etc. have the structure below. The glycidyl group of the compound having those glycidyl group are ring-opened to become a glycol represented by general formula (6).

[Chemical Formula 6]

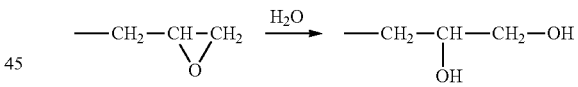

(6)

Those such as monoglycidyl compound represented by general formula (1), the diglycidyl compound represented in general formula (2), the diglycidyl compound represented in general formula (3), glycerin diglycidyl ether, diglycerine tetraglycidyl ether and etc. are compounds having 1 to 4 glycidyl groups. In the present invention, the compound having 1 to 4 glycidyl groups or its ring-opening compound can be suitably used. However, as the glycidyl group containing compound or its ring-opening compound in the present invention, in addition to the compound having 1 to 4 glycidyl groups or its ring-opening compound as mentioned above, it is also possible to use alcohol-soluble epoxy resin or its ring-opening compound, alcohol-soluble polyglycerin polyglycidyl or its ring-opening compound, and epoxy polysiloxane or its ring-opening compound. As the alcohol-soluble epoxy resin, for example, a commercially available product with the product name, "WATER SOL BC-3010" from DIC Corporation, can be suitably used. As the alcohol-soluble polyglycerin polyglycidyl, for example, a commercially available product with the product name, "SR-4GLS" from Sakamoto Yakuhin Kogyo Co., Ltd., can be suitably used. As the epoxy polysiloxane above, for example, a commercially available product with product name such as "X-41-1053," "X-41-1056," or "X-41-1059A" from Shin-etsu Chemistry Co., Ltd. can be suitably used. The ring-opening compounds of these alcohol-soluble epoxy resin, alcohol-soluble polyglycerin polyglycidyl, epoxy polysiloxane, and etc. are due to the reaction of ring-opening of the glycidyl groups, so as to become a glycol as represented by general formula (6) above.

In case where the glycidyl group containing compound has two or more glycidyl groups, the ring-opening compound of all the glycidyl groups do not necessarily ring-opened, but it is possible that only a part thereof can be ring-opened.

Here, regarding the monoglycidyl compound as represented by general formula (1) and its ring-opening compound, the specific examples can include epoxy propanol (i.e., glycidol), methyl glycidyl ether, ethyl glycidyl ether, propyl glycidyl ether, butyl glycidyl ether, epoxybutane (i.e., glycidyl methane), epoxypentane (i.e., glycidyl ethane), epoxyhexane (i.e., glycidyl propane), epoxyheptane (i.e., glycidyl butane), epoxyoctane (i.e., glycidyl pentane), glycidoxypropyltrimethoxysilane, glycidoxypropylmethyldimethoxysilane, glycidoxypropyltriethoxysilane, glycidoxypropylmethyldiethoxysilane, 2-(3,4-epoxycyclohexyl)ethyltrimethoxysilane, and glycidyl methacrylate. In particular, epoxy propanol, butyl glycidyl ether, epoxybutane, and 2-(3,4-epoxycyclohexyl)ethyltrimethoxysilane are preferable.

The examples of the diglycidyl compound represented by general formula (2) can include ethylene glycol diglycidyl ether, propylene glycol diglycidyl ether, butylene glycol diglycidyl ether, pentylene glycol diglycidyl ether, hexylene glycol diglycidyl ether, and glycerin diglycidyl ether. In particular, ethylene glycol diglycidyl ether and propylene glycol diglycidyl ether are preferable.

The examples of the diglycidyl compound represented by general formula (3) can include diethylene glycol diglycidyl ether, dipropylene glycol diglycidyl ether, triethylene glycol diglycidyl ether, tripropylene glycol diglycidyl ether, polyethylene glycol diglycidyl ether, and polypropylene glycol diglycidyl ether. In particular, polyethylene glycol diglycidyl ether is preferable.

The glycidyl group containing compound or its ring-opening compound, as mentioned above, can be used alone, or in combination of two or more kinds.

The glycidyl group containing compound or its ring-opening compound as mentioned above can include ones having a high boiling point (for example, ethylene glycol diglycidyl ether has a boiling point of 112° C./0.6 kPa). They might not be able to be removed by normal drying process and can be left in the conductive polymer. However, even if it is left therein, the Examples described later show that it does not result in an increase of the ESR or a drop of the capacitance, nor brings about a drop of the withstanding voltage property.

The glycidyl group containing compound or its ring-opening compound can be added at the following content with respect to the organic ferric sulfonate. That is, it is preferably added at a content of 5 to 100% by mass standard (i.e., 5 to 100 parts by mass of the glycidyl group containing compound or its ring-opening compound are added to 100 parts by mass of the organic ferric sulfonate). When the content of the glycidyl group containing compound or its ring-opening compound is lower than the range above, the function to enhance the withstanding voltage property cannot be sufficiently given. By contrast, when the content of the glycidyl group containing compound or its ring-opening compound is more than the range above, the effects obtained by increasing the content can be given little. In addition, the costs might be raised while it can be non-miscible, and the stability of the oxidant dopant agent solution can be deteriorated. Also, the glycidyl group containing compound or its ring-opening compound with respect to the organic ferric sulfonate can be added as follow. Namely, within the range discussed above, it can be added by mass standard at a content of 10 mass % or more, and more preferably at a content of 14% or more, and also, it can be added at a content of 40% or less, and more preferably at a content of 36% or less.

When the polyalcohol is further added into the oxidant dopant agent solution including the compound having glycidyl group or its ring-opening compound above, the effects to improve the withstanding voltage property based on the addition of the compound having glycidyl group or its ring-opening compound can be further enhanced, and furthermore, the ESR can be reduced more.

The polyalcohol to be used is preferably one including an aliphatic hydrocarbon having a carbon number of 2 to 10 further attaching 2 to 3 hydroxy groups thereto. The specific examples of the polyalcohol can include ethylene glycol, propanediol, butanediol, pentanediol, hexanediol, heptanediol, octanediol, nonanediol, decanediol, glycerol and etc. In particular, glycerol, ethylene glycol, propanediol, and butanediol are preferable.

Regarding the content of the polyalcohol in the oxidant dopant agent solution, it is preferable that the polyalcohol is added by mass standard at a content of 20% or less with respect to the organic ferric sulfonate (i.e., the polyalcohol is added 20 parts by mass or less with respect to 100 parts by mass of the organic ferric sulfonate). Although the effects by the polyalcohol addition can be increased depending on the quantity even if it is added at a small quantity. However, in order to give the effect more clearly, it is preferable that the polyalcohol is added by mass standard at a content of 4% or more with respect to the organic ferric sulfonate. Also, as the content of the polyalcohol is increased, the viscosity of the oxidant dopant agent solution can be increased. Therefore, it is preferable that the polyalcohol is added at a content of 20% or less by mass standard with respect to the organic ferric sulfonate.

The order of the addition of the glycidyl group containing compound or its ring-opening compound and the polyalcohol is not particularly limited. They can be added concurrently, or one can be add before the other is added.

In the present invention, the monomer to synthesize the conductive polymer can include thiophene or its derivative, pyrrole or its derivative, and aniline or its derivative. In particular, thiophene or its derivative can be preferably used. As explained before, the conductive polymer obtained by polymerizing thiophene or its derivative can be provided with a balanced feature in the conductivity and the heat resistance, and therefore, it can be possible to obtain an electrolyte capacitor more excellent in the capacitor properties than any other monomers.

Regarding thiophene or its derivative, the examples of the derivative of thiophene can include 3,4-ethylenedioxythiophene, 3-alkylthiophene, 3-alkoxythiophene, 3-alkyl-4-alkoxythiophene, 3,4-alkylthiophene and 3,4-alkoxythiophene, and alkylated ethylenedioxythiophene which has modified 3,4-ethylenedioxythiophene with an alkyl group. Here, the alkyl group and alkoxy group can preferably have a carbon number of 1 to 16, and more preferably it has 1 to 10, and yet more preferably it has 1 to 4.

Further explanation is made for the alkylated ethylenedioxy thiophene in which 3,4-ethylenedioxy thiophene is modified with an alkyl group. 3,4-ethylenedioxy thiophene and the alkylated ethylenedioxy thiophene as mentioned above correspond to a compound represented by the following formula (7).

[Chemical Formula 7]

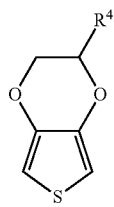

(7)

(In the formula, $R^4$ is hydrogen or an alkyl group.)

In the formula (7) mentioned above, when R4 is hydrogen, it is 3,4-ethylenedioxythiophene. When it is expressed by the IUPAC name, it is 2,3-dihydro-thieno[3,4-b][1,4] dioxine. However, this compound is often expressed by its common name, "3,4-ethylenedioxythiophene," rather than the IUPAC name. Therefore, this specification refers it as "3,4-ethylenedioxythiophene" rather than "2,3-dihydro-thieno[3,4-b][1,4] dioxine." Also, when $R^4$ in the formula (7) is an alkyl group, this alkyl group is preferably of a carbon number of 1 to 10. In particular, one with a carbon number of 1 to 4 is preferable. Namely, the alkyl group is preferably methyl group, ethyl group, propyl group, or butyl group. Specifically, when R4 in formula (7) is methyl group, such a compound is expressed as "2-methyl-2,3-dihydro-thieno[3,4-b][1,4]dioxine" under the IUPAC name, which is hereinafter simply referred to as "methylated ethylenedioxythiophene." When R4 in formula (7) is ethyl group, such a compound is "2-ethyl-2,3-dihydro-thieno[3,4-b][1,4]dioxine" under the IUPAC name. Hereinafter, this compound is simply referred to as "ethylated ethylenedioxythiophene."

When R4 in formula (7) is propyl group, such a compound is "2-propyl-2,3-dihydro-thieno[3,4-b][1,4]dioxine" under the IUPAC name. Hereinafter, this compound is simply referred to as "propylated ethylenedioxythiophene." Also, when R4 in formula (7) is butyl group, such a compound is "2-butyl-2,3-dihydro-thieno[3,4-b][1,4]dioxine" under the IUPAC name. Hereinafter, this compound is simply referred to as "butylated ethylenedioxythiophene." In addition, "2-alkyl-2,3-dihydro-thieno[3,4-b][1, 4]dioxine" is simply referred to as "alkylated ethylenedioxythiophene." Here, among the alkylated ethylenedioxy thiophenes, particularly preferable are methylated ethylenedioxythiophene, ethylated ethylenedioxythiophene, propylated ethylenedioxythiophene, and butylated ethylenedioxythiophene.

Also, it is preferable that 3,4-ethylenedioxythiophene (namely, 2,3-dihydro-thieno[3,4-b][1,4]dioxine) and the alkylated ethylenedioxythiophene (namely, 2-alkyl-2,3-dihydro-thieno[3,4-b][1,4]dioxine) are mixed together for use. The mixture ratio is at a molar ratio of 0.05:1 to 1:0.1. Particularly, it is 0.1:1 to 1:0.1. More particularly, it is 0.2:1 to 1:0.2. Yet more preferably, it is 0.3:1 to 1:0.3.

The oxidant dopant agent for conductive polymer preparation is constituted by including an organic ferric sulfonate, and at least one kind selected from the group consisting of phosphoric acid, phosphate, phosphorous acid, phosphite, boric acid, borate, thiophosphoric acid, thiophosphate, dithiophosphoric acid and dithiophosphate. Alternatively, it can be constituted by including the inevitable two elements above, in combination of a glycidyl group containing compound or its ring-opening compound. In addition, a silane coupling agent, polysiloxane, and a polymer or a polymerized compound such as alcohol-soluble resin and polyethylene glycol can be added.

The production of the conductive polymer by using the oxidant dopant agent solution of the present invention is applicable to both normal production of the conductive polymer, and the production of the conductive polymer at the time of producing electrolyte capacitors, that is, so-called "on-site polymerization."

The monomer such as thiophene or its derivative is liquid at room temperature, so that it can be used as it is for polymerization. Also, in order to more smoothly progress the polymerization reaction, the monomer can be diluted with an organic solvent such as methanol, ethanol, propanol, butanol, acetone and acetonitrile to make it an organic solvent solution. Note that the explanation here is made for thiophene or its derivative as a monomer, since it is particularly preferable embodiment. However, pyrrole or its derivative, and aniline or its derivative can be used in the same manner as thiophene or its derivative, as well.

In case of the normal production of the conductive polymer (the normal production of the conductive polymer means that it is not, so-called, the "on-site polymerization," that is, the production of the conductive polymer at the time of producing electrolyte capacitors), a mixture of the oxidant dopant agent solution of the present invention and thiophene or its derivative as a monomer is used (the mixture ratio of the oxidant dopant agent and monomer is preferably from 5:1 to 15:1 by mass standard). For example, an oxidation polymerization is performed at 5 to 95° C. for 1 to 72 hours.

As described above, the oxidant dopant agent of the present invention is anyway mixed with a monomer when producing an electrolyte capacitor. Therefore, regarding the oxidant dopant agent, the organic ferric sulfonate is not necessarily mixed with said at least one kind selected from the group consisting of phosphoric acid, phosphate, phosphorous acid, phosphite, boric acid, borate, thiophosphoric acid, thiophosphate, dithiophosphoric acid and dithiophosphate, so as to provide the oxidant dopant agent prior to mixing it with a monomer. Instead, the same state above can be made if the organic ferric sulfonate is concurrently mixed with a monomer and said at least one kind selected from the group consisting of phosphoric acid, phosphate, phosphorous acid, phosphite, boric acid, borate, thiophosphoric acid, thiophosphate, dithiophosphoric acid and dithiophosphate, thereby providing a mixture of the oxidant dopant agent including the monomer. Moreover, the same state above can be also made when a monomer is mixed with said at least one kind selected from the group consisting of phosphoric acid, phosphate, phosphorous acid, phosphite, boric acid, borate, thiophosphoric acid, thiophosphate, dithiophosphoric acid and dithiophosphate, into which the organic ferric sulfonate is then added, thereby providing a mixture of the oxidant dopant agent including the monomer. Therefore, in producing the electrolyte capacitor, the oxidant dopant agent of the present invention can be prepared in either way as explained above.

The oxidant dopant agent solution of the present invention was particularly developed for so-called "on-site polymerization" at the time of production of electrolyte capacitors by producing a conductive polymer of a monomer, thiophene or its derivative. Therefore, the explanation is made for such an embodiment.

Also, the electrolyte capacitors can include aluminum electrolyte capacitor, tantalum electrolyte capacitor, niobium electrolyte capacitor, and etc. Among aluminum electrolyte capacitors, there are a winding-type aluminum electrolyte capacitor, and a laminated-type or flat type aluminum electrolyte capacitor. Since the oxidant dopant agent solution of the present invention can be applicable to the production of the winding-type aluminum electrolyte capacitor, such an example is first explained.

First, as the capacitor element for the winding-type aluminum electrolyte capacitor, a surface of an aluminum foil is applied to an etching treatment followed by carrying out a conversion treatment, thereby forming a positive electrode having a dielectric layer, to which a lead terminal is attached. Also, a lead terminal is attached to a negative electrode made of an aluminum foil. These positive electrode and negative electrode having lead terminals are wound together with an intervention of a separator, thereby forming a favorable capacitor element.

Then, the following is an example when producing the winding-type aluminum electrolyte capacitor by using the capacitor element mentioned above. Namely, the capacitor element above is immersed in a mixture of the oxidant dopant agent solution of the present invention including a monomer (thiophene or its derivative), and then it is pulled up (taken out). Then, at room temperature or under heating, the monomer is polymerized to form an electrolyte layer made of a conductive polymer having a polymer backbone of a polymer of thiophene or its derivative. Then, the capacitor element having the electrolyte layer is surrounded by an exterior material to provide a winding-type aluminum electrolyte capacitor.

Alternatively, instead of immersing the capacitor element in the mixture of oxidant dopant agent solution of the present invention, and a monomer, the following method can be adopted. The monomer is diluted with the organic solvents such as methanol, as explained before. Then, the capacitor element is immersed in the monomer solution, and pulled up for drying. Then, the capacitor element is immersed in the oxidant dopant agent solution of the present invention, and then, it is pulled up. Then, the monomer is polymerized at room temperature or under heating. Or, the capacitor element is first immersed in the oxidant dopant agent solution of the present invention, and then, it is pulled up for drying. The capacitor element is then immersed in a monomer, and pulled up, followed by polymerizing the monomer at room temperature or under heating. Then, a winding-type aluminum electrolyte capacitor can be prepared in the same manner as explained before.

Other than the winding-type aluminum electrolyte capacitor as mentioned above, the electrolyte capacitor such as a laminated-type or flat type aluminum electrolyte capacitor, tantalum electrolyte capacitor, or niobium electrolyte capacitor can be prepared as follow. The capacitor element used is a positive electrode made of a porous body of a valve metal such as aluminum, tantalum, niobium, and etc., and a dielectric film of an oxidation film of the valves metal. In the same manner as the winding-type aluminum electrolyte capacitor, the capacitor element is immersed in the mixture of the oxidant dopant agent solution of the present invention and a monomer, and then it is pulled up, followed by polymerizing the monomer at room temperature or under heating. Or, the capacitor element is immersed in a monomer solution and pulled up for drying, which is then immersed in the oxidant dopant agent solution of the present invention and pulled up, followed by polymerizing the monomer at room temperature or under heating. Or, the capacitor element is immersed in the oxidant dopant agent solution of the present invention and pulled up for drying, which is then immersed in a monomer solution and pulled up, followed by polymerizing the monomer at room temperature or under heating, and then the capacitor element is washed and dried. Then, the process is repeated to form an electrolyte layer made of a conductive polymer, followed by applying carbon paste and silver paste. Then, it is dried and surrounded on its outer surface, thereby providing a laminated-type or flat type aluminum electrolyte capacitor, tantalum electrolyte capacitor, niobium electrolyte capacitor, and etc.

In addition, the explanation above involves the immersion of the capacitor element. That is, the capacitor element is immersed in the mixture of the oxidant dopant agent solution of the present invention and the monomer, or it is immersed in the monomer solution, or it is immersed in the oxidant dopant solution of the present invention. However, the capacitor element can be sprayed to apply it to impregnate with it.

In the production of the conductive polymer, or in the production of the conductive polymer to produce the electrolyte capacitor by "on-site polymerization," the following is preferable. Regarding the use ratio of the oxidant dopant agent solution of the present invention, and the monomer (thiophene or its derivative) or the monomer solution monomer, the mass ratio of the organic ferric sulfonate to become the oxidant dopant agent and the monomer is preferably from 2:1 to 8:1. The "on-site polymerization" can be performed, for example, at 10 to 300° C. for 1 to 180 minutes.

Also, in the production of the electrolyte capacitor, a conductive polymer by using oxidant dopant agent solution of the present invention is formed, and then, on the conductive polymer, a conductive polymer layer is formed by using a π conjugated system conductive polymer dispersion liquid. That is, an electrolyte is constituted by both, thereby providing an electrolyte capacitor.

The π conjugated system conductive polymer that can be used is a π conjugated system conductive polymer using a polymer anion as a dopant.

The polymer anion is mainly comprised of a polymeric sulfonic acid. Such a polymer anion is explained in detail. The examples of the polymer anion can include polystyrene sulfonic acid, sulfonated polyester, phenolsulfonic acid novolac resin, and a copolymer of styrenesulfonic acid and a non-sulfonic acid system monomer.

Regarding the polystyrene sulfonate above, its weight average molecular weight can be preferably 10,000 to 1,000,000.

Namely, when the weight average molecular weight of the polystyrene sulfonic acid above is smaller than 10,000, thereby obtained conductive polymer might have a low conductivity. By contrast, when the weight average molecular weight of the polystyrene sulfonate above is larger than 1,000,000, the viscosity of the dispersion liquid of the conductive polymer becomes high, and therefore, it might be difficult to handle it in the production of an electrolyte capacitor. Furthermore, within the range of the weight average molecular weight of the polystyrene sulfonic acid mentioned above, it is preferably 20,000 or more, and more preferably 40,000 or more, and also, it is preferably 800,000 or less, and more preferably 300,000 or less.

The sulfonated polyester above can be obtained by condensation polymerization from a dicarboxybenzenesulfonic acid diester such as sulfoisophthalate and sulfoterephthalate, and an alkylene glycol in the presence of a catalyst such as antimony oxide or zinc oxide. The weight average molecular weight of the sulfonated polyesters can be preferably 5,000 to 300,000.

Namely, when the weight average molecular weight of the sulfonated polyester is lower than 5,000, thereby obtained conductive polymer might have a low conductivity. Also, when the weight average molecular weight of the sulfonated polyester above is larger than 300,000, the viscosity of the dispersion liquid of the conductive polymer becomes high, and therefore, it might be difficult to handle it in the production of an electrolyte capacitor. Furthermore, within the range of the weight average molecular weight of the sulfonated polyester above, it is preferably 10,000 or more, and more preferably 20,000 or more, and also, it is preferably 100,000 or less, and more preferably 80,000 or less.

Also, the weight average molecular weight of the phenolsulfonic acid novolac resin can be preferably 5,000 to 500,000.

Namely, when the weight average molecular weight of the phenolsulfonic acid novolac resin above is smaller than 5,000, thereby obtained conductive polymer might be low in the conductivity. By contrast, when the weight average molecular weight of the phenolsulfonic acid novolac resin above is larger than 500,000, the viscosity of the dispersion liquid of the conductive polymer becomes high, and therefore, it might be difficult to handle it in the production of an electrolyte capacitor. Furthermore, within the range of the weight average molecular weight of the phenolsulfonic acid novolac resin above, it is preferably 10,000 or more, and also, it is preferably 400,000 or less, and more preferably 80,000 or less.

The polymer anion such as polystyrene sulfonic acid, sulfonated polyester, and phenolsulfonic acid novolac resin as mentioned above can be used alone or in combination of two kinds or more.

A copolymer made from styrenesulfonic acid, and at least one kind of a non-sulfonic acid monomer selected from the group of methacrylate, acrylate, and unsaturated hydrocarbon containing alkoxysilane compound or its hydrolysate (which can be hereinafter referred to as "copolymer of styrenesulfonic acid and non-sulfonic acid monomer") is used as a dopant. Thereby obtained conductive polymer of thiophene or its derivative obtained by oxidation polymerization has a high conductivity and superior heat resistance. Therefore, it is suitable to manufacture an electrolyte capacitor which is low in the ESR, reliable under a hot condition, and causes less leakage current.

There is provided an explanation of the polymerization of the copolymer from styrenesulfonic acid, and at least one kind of a non-sulfonic acid monomer selected from the group consisting of methacrylate, acrylate, and unsaturated hydrocarbon containing alkoxysilane compound or a hydrolysate thereof. The monomer to be copolymerized with the styrenesulfonic acid is at least one kind of a non-sulfonic acid monomer selected from the group of methacrylate, acrylate, and unsaturated hydrocarbon containing alkoxysilane compound or a hydrolysate thereof. The examples of the methacrylate as mentioned above can include methyl methacrylate, ethyl methacrylate, propyl methacrylate, butyl methacrylate, hexyl methacrylate, stearyl methacrylate, cyclohexyl methacrylate, diphenylbutyl methacrylate, dimethylaminoethyl methacrylate, diethylaminoethyl methacrylate, sodium sulfohexyl methacrylate, glycidyl methacrylate, methylglycidyl methacrylate, hydroxyalkyl methacrylate, (namely, hydroxyalkyl methacrylate such as hydroxymethyl methacrylate, hydroxyethyl methacrylate, hydroxypropyl methacrylate, hydroxybutyl methacrylate, hydroxyhexyl methacrylate, hydroxystearyl methacrylate), hydroxypolyoxyethylene methacrylate, methoxyhydroxypropyl methacrylate, ethoxyhydroxypropyl methacrylate, dihydroxypropyl methacrylate, and dihydroxybutyl methacrylate. In particular, preferable are hydroxyalkyl methacrylate such as hydroxymethyl methacrylate, hydroxyethyl methacrylate, hydroxypropyl methacrylate and hydroxybutyl methacrylate. The carbon number of these compounds is 1 to 4. It is preferable to show a characteristic serving as a dopant when it is copolymerized with styrenesulfonic acid. Also, the compounds such as glycidyl methacrylate and methylglycidyl methacrylate include a glycidyl group. These compounds have a structure having hydroxyl group when opening the glycidyl group. Therefore, in the same reasons as the hydroxyalkyl methacrylate, a glycidyl group containing compound is also preferable in view of the characteristic serving as a dopant when it is copolymerised with styrenesulfonic acid.

Also, the examples of the acrylate as mentioned above can include methyl acrylate, ethyl acrylate, propyl acrylate, butyl acrylate, hexyl acrylate, stearyl acrylate, cyclohexyl acrylate, diphenylbutyl acrylate, dimethylaminoethyl acrylate, diethylaminoethyl acrylate, sodium sulfohexyl acrylate, glycidyl acrylate, methylglycidyl acrylate, hydroxyalkyl acrylate, (namely, hydroxyalkyl acrylate such as hydroxymethyl acrylate, hydroxyethyl acrylate, hydroxypropyl acrylate, and hydroxybutyl acrylate). In particular, preferable are hydroxymethyl acrylate, hydroxyethyl acrylate, hydroxypropyl acrylate and hydroxybutyl acrylate. The carbon number of these compounds is 1 to 4. These compounds are preferable in view of the characteristic serving as a dopant when it is copolymerized with styrenesulfonic acid. Also, the compounds such as glycidyl acrylate and methylglycidyl acrylate include a glycidyl group. These compounds have a structure having hydroxyl group when opening the glycidyl group. Therefore, in the same reasons as the hydroxyalkyl acrylate, a glycidyl group containing compound is also preferable in view of the characteristic serving as a dopant when it is copolymerized with styrenesulfonic acid.

As the unsaturated hydrocarbon containing alkoxysilane compound or its hydrolysate as mentioned above, the followings can be exemplified. That is, the examples thereof can include an unsaturated hydrocarbon containing alkoxysilane compound and its hydrolysate such as 3-methacryloxypropyltrimethoxysilane, 3-methacryloxypropylmethyldimethoxysilane, 3-methacryloxypropyldimethylmethoxysilane, 3-methacryloxypropyldimethylethoxysilane, 3-methacryloxypropyltriethoxysilane, 3-acryloxypropyltrimethoxysilane, 3-acryloxymethyldimethoxysilane, 3-acryloxymethyldiethoxysilane, 3-acryloxytriethoxysilane, p-styryltrimethoxysilane, p-styryltriethoxysilane, p-styrylmethyldimethoxysilane, vinyltrimethoxysilane, vinyltriethoxysilane, vinylmethyldimethoxysilane, and vinyldimethylmethoxysilane. The hydrolysate of such an unsaturated hydrocarbon containing alkoxysilane compound can be as follows. For example, if the unsaturated hydrocarbon containing alkoxysilane compound is 3-methacryloxypropyltrimethoxysilane as mentioned above, it can be a compound having a structure in which its methoxy group is hydrolyzed to become hydroxyl group (i.e., 3-methacryloxytrihydroxysilane), or a compound having a structure in which silane groups are condensed each other to form an oligomer while its methoxy group that has not been involved in the reaction becomes hydroxyl group. Also, as the unsaturated hydrocarbon containing alkoxysilane compound, favorable are 3-methacryloxypropyltrimethoxysilane, 3-acryloxypropyltrimethoxysilane, p-styryltrimethoxysilane, and vinyltrimethoxysilane in view of serving as a dopant when it is copolymerized with styrenesulfonic acid.

Here, the following feature can be provided in the copolymer made from styrenesulfonic acid, and at least one kind of a non-sulfonic acid monomer selected from the group consisting of methacrylate, acrylate, and unsaturated hydrocarbon containing alkoxysilane compound or its hydrolysate. A mass ratio of 1:0.01 to 0.1:1 is preferable for the styrenesulfonic acid to said at least one kind of the non-sulfonic acid monomer selected from the group of methacrylate, acrylate, and unsaturated hydrocarbon containing alkoxysilane compound or its hydrolysate.

Also, the following feature is found in the copolymer made from styrenesulfonic acid, and at least one kind of a non-sulfonic acid monomer selected from the group of methacrylate, acrylate, and unsaturated hydrocarbon containing alkoxysilane compound or its hydrolysate. Regarding the molecular weight, it has a weight average molecular weight of about 5,000 to 500,000 in view of the characteristics of the water-solubility and the dopant. In particular, it preferably has a weight average molecular weight of about 40,000 to 200,000.

The copolymer of the styrenesulfonic acid and the non-sulfonic acid monomer above can be used together with a polymer anion such as polystyrene sulfonic acid, sulfonated polyester, and phenolsulfonic acid novolac resin, as mentioned above. Also, for use, a dispersion liquid of a conductive polymer synthesized by using the copolymer from the styrenesulfonic acid and the non-sulfonic acid monomer as a dopant can be mixed with another dispersion liquid of a conductive polymer synthesized by using the polymeric sulfonic acid as a dopant.

Next, explained is the means to polymerize a conductive polymer by means of oxidation polymerization of a monomer with a polymer anion as dopant (here, the most typical monomer, that is, thiophene or its derivative is exemplified). Listed here is polystyrene sulfonic acid, sulfonated polyester, phenolsulfonic acid novolac resin, and a copolymer of styrenesulfonic acid and a non-sulfonic acid monomer (i.e., a copolymer from styrenesulfonic acid and a non-sulfonic acid monomer selected from the group consisting of methacrylate, acrylate and an unsaturated hydrocarbon containing alkoxysilane compound, and hydrolysate thereof). All of the lists above have solubility to water, or an aqueous solution of a mixture of water and a water-miscible solvent. Thus, the oxidation polymerization is performed in water or an aqueous solution.

As the water-miscible solvent constituting the aqueous solution mentioned above, the examples thereof can include methanol, ethanol, propanol, acetone, and acetonitrile. The mixing ratio of the water-miscible solvent with respect to water is preferably 50% by mass or less.

The oxidation polymerization for preparing the conductive polymer can be either through chemical oxidation polymerization or electrolytic oxidation polymerization.

To perform the chemical oxidation polymerization, a persulfate can be used as an oxidant, for example. The example of the persulfates can include ammonium persulfate, sodium persulfate, potassium persulfate, calcium persulfate, and barium persulfate.

Regarding the chemical oxidation polymerization, the condition during the polymerization is not particularly limited. The temperature in the chemical oxidation polymerization is preferably 5° C. to 95° C., and in more particular, it is 10° C. to 30° C. The polymerization period is preferably one hour to 72 hours, and more preferably, it is 8 hours to 24 hours.

The electrolytic oxidation polymerization can be carried out either in constant current or constant voltage. For example, when the electrolytic oxidation polymerization is performed in constant current, its current value is preferably 0.05 mA/cm2 to 10 mA/cm2, and it is more preferably 0.2 mA/cm$^2$ to 4 mA/cm$^2$. When the electrolytic oxidation polymerization is performed in constant voltage, its voltage is preferably 0.5V to 10V, and it is more preferably 1.5V to 5V. The temperature at the time of the electrolytic oxidation polymerization is preferably 5° C. to 95° C., and it is more preferably 10° C. to 30° C. The polymerization period is preferably one hour to 72 hours, and it is more preferably 8 hours to 24 hours. In addition, upon the electrolytic oxidation polymerization, ferrous sulfate or ferric sulfate can be added as a catalyst.

Just after the polymerization as prepared above, the conductive polymer can be obtained as a dispersion state in water or the aqueous solution, which includes a persulfate used as an oxidant, or an iron sulfate or its decomposition product used as a catalyst. Therefore, the dispersion liquid of the conductive polymer including the impurities can be applied to a dispersion machine such as an ultrasonic homogenizer, high-pressure homogenizer or planetary ball mill to disperse the impurities. Then, the metal components can be favorably removed by using a cation-exchange resin. At this time, the particle size of the conductive polymer measured by means of dynamic light scattering is preferably 100 μm or less, and it is more preferably 10 μm or less. Also, it is preferably 0.01 μm or more, and it is more preferably 0.1 μm or more. Then, a process such as ethanol precipitation process, ultrafiltration process and anion exchange resin process can be applied to remove the compounds generated by the decomposition of the oxidant and the catalyst.

In the present invention, the oxidant dopant agent for conductive polymer preparation or its solution can be used to subject to oxidation polymerization of a monomer such as thiophene or its derivative to prepare a conductive polymer, which is used as an electrolyte to constitute an electrolyte capacitor. Or, both of the conductive polymer above and another conductive polymer obtained by a π conjugated system conductive polymer dispersion liquid including a polymer anion as a dopant are used as an electrolyte to constitute an electrolyte capacitor, as well. Furthermore, a conductive auxiliary liquid can be soaked to constitute an electrolyte capacitor, in which the conductive auxiliary liquid includes: a high boiling point organic solvent with a boiling point of 150° C. or more; or a high boiling point organic solvent with a boiling point of 150° C. or more, and an aromatic compound having at least one of hydroxyl group and carboxyl group.

Namely, the one conductive polymer is made by the oxidant dopant agent for conductive polymer preparation or its solution which is subject to oxidation polymerization of a monomer such as thiophene or its derivative. The other conductive polymer is obtained by a π conjugated system conductive polymer dispersion liquid including a polymer anion as a dopant. Both of the one and the other conductive polymers can be used as an electrolyte to constitute an electrolyte capacitor. As shown in Examples 118 to 119, such an embodiment had a lower leak current of the electrolyte capacitor than the case in which only one conductive polymer obtained from the oxidant dopant agent for conductive polymer preparation or its solution to carry out the oxidation polymerization of the monomer such as thiophene or its derivative and use it as an electrolyte to constitute an electrolyte capacitor. Also, an electrolyte capacitor can be provided with lower ESR and superior heat resistance when the conductive auxiliary liquid is soaked to constitute an electrolyte capacitor, in which the conductive auxiliary liquid includes: a high boiling point organic solvent with a boiling point of 150° C. or more; or a high boiling point organic solvent with a boiling point of 150° C. or more, and an aromatic compound having at least one of hydroxyl group and carboxyl group.

The conductive auxiliary liquid above can include a conductive solution having a conductivity (electric conductivity) lower than the conductivity of normal electrolyte liquid (usually the conductivity of 3 mS/cm or more), or a solution having a conductivity equal to, or higher than, the electrolyte liquid. By constituting an electrolyte capacitor having soaked with such a conductive solution, lower ESR and more superior heat resistance can be accomplished than the case in which a high boiling point organic solvent with a boiling point of 150° C. or more is soaked without the aromatic compound having at least one of hydroxyl group and carboxyl group.

Even if the conductive auxiliary liquid above has a lower conductivity than the electrolyte liquid, it can make the electrolyte capacitor have lower ESR and superior heat resistance. Numerically, it can be used if it has a conductivity of 1 μS/cm or more, and preferably it has a conductivity of 5 μS/cm or more, and more preferably it has a conductivity of 8 μS/cm or more.

In the present invention, the conductivity of the conductive auxiliary liquid can be measured at a temperature of 25° C., by using a conductivity measurement instrument (F-55) made by Horiba Seisakusho, Ltd. However, other conductivity measurement instrument equivalent thereto can be used to measure.

The conductive auxiliary liquid includes a high boiling point organic solvent having a boiling point of 150° C. or more, and an aromatic compound having at least one of hydroxyl group and carboxyl group.

The examples of the high boiling point organic solvent having a boiling point of 150° C. or more can include gamma-butyrolactone (boiling point=204° C.), butanediol (boiling point=230° C.) dimethylsulfoxide (boiling point=189° C.), sulfolane (boiling point=285° C.), N-methylpyrrolidone (boiling point=202° C.), dimethylsulfolane (boiling point=233° C.), ethylene glycol (boiling point=198° C.), diethylene glycol (boiling point=244° C.), triethyl phosphate (boiling point=215° C.), tributyl phosphate (289° C.), triethylhexyl phosphate [215° C. (4 mmHg)] and polyethylene glycol, which can be used alone or in combination of two or more. It is noted that some kinds of polyethylene glycols do not have a boiling point under normal pressure, such as polyethylene glycol 600 and polyethylene glycol 1500 (here, the number just after the term "polyethylene glycol" means its molecular weight). However, no kinds of polyethylene glycols boil at a temperature of 150° C. or less under normal pressure. In the present invention, polyethylene glycols shall be included as a group of the solvents having a high boiling point.

Such a high boiling point organic solvent with a boiling point of 150° C. or more is used as a solvent to dissolve an aromatic compound having at least one of hydroxyl group and carboxyl group in the conductive auxiliary liquid of the present invention. The reasons why such an organic solvent with such a high boiling point is used as a solvent in the present invention are explained. Namely, the electrolyte capacitor can be provided with lowers ESR and superior heat resistance as explained above. Also, because of such a high boiling point, an increase of internal pressure can be restricted at the time of the soldering during the production of the electrolyte capacitor while volatilization of the organic solvent can be also restricted for a long term.

Regarding the aromatic compound having at least one of hydroxyl group and carboxyl group, the hydroxyl group is the group bonded to the constitution carbons to make the aromatic ring, which is distinct from the —OH part included in the carboxyl group. The aromatic compound having at least one of hydroxyl group and carboxyl group can include benzene compounds, naphthalene compounds, and anthracene compounds. The examples thereof can include hydroxybenzene carboxylic acid, nitrophenol, dinitrophenol, trinitrophenol, aminonitrophenol, hydroxyanisole, hydroxydinitrobenzene, dihydroxydinitrobenzene, alkylhydroxyanisole, hydroxynitroanisole, hydroxynitrobenzene carboxylic acid (i.e., hydroxynitrobenzoic acid), dihydroxynitrobenzene carboxylic acid (i.e., dihydroxynitrobenzoic acid), phenol, dihydroxybenzene, trihydroxybenzene, dihydroxybenzene carboxylic acid, trihydroxybenzene carboxylic acid, hydroxybenzene dicarboxylic acid, dihydroxybenzene dicarboxylic acid, hydroxytoluene carboxylic acid, nitronaphthol, aminonaphthol, dinitronaphthol, hydroxynaphthalene carboxylic acid, dihydroxynaphthalene carboxylic acid, trihydroxynaphthalene carboxylic acid, hydroxynaphthalene dicarboxylic acid, dihydroxynaphthalene dicarboxylic acid, hydroxyanthracene, dihydroxyanthracene, trihydroxyanthracene, tetrahydroxyanthracene, hydroxyanthracene carboxylic acid, hydroxyanthracene dicarboxylic acid, dihydroxyanthracene dicarboxylic acid, tetrahydroxyanthracene dione, benzenecarboxylic acid, benzenedicarboxylic acid, naphthalenecarboxylic acid, and naphthalenedicarboxylic acid. These compounds can be used alone or in combination of two or more.

The aromatic compound having at least one of hydroxyl group and carboxyl group is used in constitution of the conductive auxiliary liquid in the present invention. Therefore, the aromatic compound having at least one of hydroxyl group and carboxyl group has an ability to assist the electronic conduction of the conductive polymer. In addition, it can suppress the deterioration of the conductive polymer based on the antioxidant action of the aromatic compound.

In the conductive auxiliary liquid above, the high boiling point organic solvent with a boiling point of 150° C. or more serves as a solvent, and the aromatic compound having at least one of hydroxyl group and carboxyl group serves as a solute. The concentration of the aromatic compound having at least one of hydroxyl group and carboxyl group in the conductive auxiliary liquid is preferably 0.5-50 mass %. In particular, it is preferably 2 mass % or more; and further preferably it is 5 mass % or more; also, it is preferably 30 mass % or less; and yet more preferably 20 mass % or less. In other words, when the concentration of the aromatic compound having at least one of hydroxyl group and carboxyl group is lower than the above range, the electrolyte capacitor might not result in low ESR, nor improve the heat resistance. On the other hand, when the concentration of the aromatic compound having at least one of hydroxyl group and carboxyl group is higher than the above range, the aromatic compound might precipitate, thereby making it difficult in handling, as well as deteriorate the ESR of the electrolyte capacitor.

In addition, when the high boiling point organic solvent with a boiling point of 150° C. or more, or the conductive auxiliary liquid includes at least one binder selected from the group of epoxy compound or its hydrolysate, silane or its hydrolysate, and polyalcohol, the action to improve the withstanding voltage property of the electrolyte capacitor can be increased, and therefore, such inclusion is preferable.

The concentration of the binder is preferably 0.05-20 mass %, and more preferably, 0.5-5 mass % in the high boiling point organic solvent with a boiling point of 150° C. or more, or in the conductive auxiliary liquid.

The examples of the epoxy compound or its hydrolysate can include polyethylene glycol diglycidyl ether, diethylene glycol glycidyl, glycidyl methacrylate, epoxypropanol (i.e., glycidol), methyl glycidyl ether, ethyl glycidyl ether, propyl glycidyl ether, butyl glycidyl ether, epoxybutane (i.e., glycidyl methane), epoxypentane (i.e., glycidyl ethane), epoxyhexane (i.e., glycidyl propane), epoxyheptane (i.e., glycidyl butane), epoxyoctane (i.e., glycidyl pentane), epoxycyclohexene, ethylene glycol diglycidyl ether, propylene glycol diglycidyl ether, butylene glycol diglycidyl ether, pentylene glycol diglycidyl ether, hexylene glycol diglycidyl ether, and glycerol diglycidyl ether. The examples of the silane compound or its hydrolysate can include 3-glycidoxypropyltrimethoxysilane, 2-(3,4-epoxycyclohexyl) ethyltrimethoxysilane, vinyltrimethoxysilane, p-styryltrimethoxysilane, 3-methacryloxypropylmethyldimethoxysilane, 3-acryloxypropyltrimethoxysilane, 3-mercaptopropylmethyldimethoxysilane, 3-isocyanatepropyltriethoxysilane, tetramethoxysilane, tetraethoxysilane, and silica sol. The examples of the polyalcohol can include polyethylene glycol, polypropylene glycol, and polybutylene glycol.

EXAMPLES

Next, the present invention is explained more in detail with reference to the Examples, but the construction of the present invention should not be limited to the Examples alone. It is noted that in the Examples, the indication of % for the concentration or content is mass % unless otherwise noted.

The Examples are described here for an electrolyte capacitor produced by using a conductive polymer as an electrolyte, which is prepared by using the oxidant dopant agent for conductive polymer production and its solution.
[Preparation of Oxidant Dopant Agent Solution for Conductive Polymer Preparation (1)]

Regarding the preparation (1) of the oxidant dopant agent for conductive polymer preparation solution (which can be hereinafter simplifies as "oxidant dopant agent solution"), the oxidant dopant agent solution of Examples 1 to 30 and the oxidant dopant agent solution of Comparative Example 1 are shown. The oxidant dopant agent solutions of Examples 1 to 30 were used in the production of the tantalum electrolyte capacitors of Examples 31 to 60, and the oxidant dopant agent solution of Comparative Example 1 was used in the production of the tantalum electrolyte capacitor of Comparative Example 2, as described later.

Example 1

5.7 kg of ferric naphthalenesulfonate (a molar ratio of 1:2.70 for iron versus naphthalenesulfonic acid) was dissolved to prepare 10 kg of an ethanol solution (1% of water content).

Then, 10 kg of the ethanol solution of the ferric naphthalenesulfonate above was put into a reaction vessel having an internal volume of 20 L, into which 300 g of dibutyl phosphate (5.26% with respect to the ferric naphthalenesulfonate) was added. Then, there was heated such that the temperature of the contents reached 80° C., and a reflux was continued for one hour to prepare an oxidant dopant agent solution.

Example 2

Except that replacing with 10 kg of the ethanol solution in which 5.7 kg of ferric naphthalenesulfonate was dissolved, 10 kg of an ethanol solution (1% of water content) in which 4.7 kg of ferric naphthalenesulfonate (a molar ratio of 1:2.70 for iron versus naphthalenesulfonic acid) and 1 kg of ferric methanesulfonate (a molar ratio of 1:2.70 for iron versus methane sulfonic acid) was used. Other than the above, the same procedure as Example 1 was carried out to prepare an oxidant dopant agent solution.

In Example 2, 300 g of dibutyl phosphate was contained in the oxidant dopant agent solution in the same manner as Example 1. The quantity of the dibutyl phosphate was 5.26% with respect to the organic ferric sulfonate made by ferric naphthalenesulfonate and ferric methanesulfonate.

Example 3

Except that replacing with 10 kg of the ethanol solution in which 5.7 kg of ferric naphthalenesulfonate was dissolved, 10 kg of an ethanol solution (1% of water content) in which 4.7 kg of ferric p-toluenesulfonate (a molar ratio of 1:2.70 for iron versus p-toluenesulfonic acid) and 1 kg of ferric methanesulfonate (a molar ratio of 1:2.70 for iron versus methane sulfonic acid) was used. Other than the above, the same procedure as Example 1 was carried out to prepare an oxidant dopant agent solution.

In Example 3, 300 g of dibutyl phosphate was contained in the oxidant dopant agent solution in the same manner as Example 1. The quantity of the dibutyl phosphate was 5.26% with respect to the organic ferric sulfonate made by ferric p-toluenesulfonate and ferric methanesulfonate.

Example 4

Except that replacing with 10 kg of the ethanol solution in which 5.7 kg of ferric naphthalenesulfonate was dissolved, 10 kg of an ethanol solution (1% of water content) in which 4.7 kg of ferric naphthalenesulfonate (a molar ratio of 1:2.70 for iron versus naphthalenesulfonic acid) and 1 kg of ferric p-toluenesulfonate (a molar ratio of 1:2.70 for iron versus p-toluenesulfonic acid) was used. Other than the above, the same procedure as Example 1 was carried out to prepare an oxidant dopant agent solution.

In Example 4, 300 g of dibutyl phosphate was contained in the oxidant dopant agent solution in the same manner as Example 1. The quantity of the dibutyl phosphate was 5.26% with respect to the organic ferric sulfonate made by ferric naphthalenesulfonate and ferric p-toluenesulfonate.

Example 5

Except for replacing 300 g of dibutyl phosphate with 300 g of tributyl phosphate, the same procedure as Example 1 was carried out to prepare an oxidant dopant agent solution. In Example 5, the quantity of the tributyl phosphate in the oxidant dopant agent solution was 5.26% with respect to the ferric naphthalenesulfonate.

Example 6

Except for replacing 300 g of dibutyl phosphate with 500 g of dibutyl phosphate, the same procedure as Example 1 was carried out to prepare an oxidant dopant agent solution. In Example 6, the quantity of the dibutyl phosphate in the oxidant dopant agent solution was 8.77% with respect to the ferric naphthalenesulfonate.

Example 7

Except for replacing 300 g of dibutyl phosphate with 100 g of dibutyl phosphate, the same procedure as Example 1 was carried out to prepare an oxidant dopant agent solution. In Example 7, the quantity of the dibutyl phosphate in the oxidant dopant agent solution was 1.75% with respect to the ferric naphthalenesulfonate.

Example 8

Except for replacing 300 g of dibutyl phosphate with 200 g of phosphoric acid, the same procedure as Example 1 was carried out to prepare an oxidant dopant agent solution. In Example 8, the quantity of the phosphoric acid in the oxidant dopant agent solution was 3.51% with respect to the ferric naphthalenesulfonate.

Example 9

Except for replacing 300 g of dibutyl phosphate with 200 g of phosphorous acid, the same procedure as Example 1 was carried out to prepare an oxidant dopant agent solution. In Example 9, the quantity of the phosphorous acid in the oxidant dopant agent solution was 3.51% with respect to the ferric naphthalenesulfonate.

Example 10

Except for replacing 300 g of dibutyl phosphate with 300 g of dibutyl phosphite, the same procedure as Example 1 was carried out to prepare an oxidant dopant agent solution. In Example 10, the quantity of the dibutyl phosphite in the oxidant dopant agent solution was 5.26% with respect to the ferric naphthalenesulfonate.

Example 11

Except for replacing 300 g of dibutyl phosphate with 300 g of tributyl phosphite, the same procedure as Example 1 was carried out to prepare an oxidant dopant agent solution. In Example 11, the quantity of the tributyl phosphite in the oxidant dopant agent solution was 5.26% with respect to the ferric naphthalenesulfonate.

Example 12

Except for replacing 300 g of dibutyl phosphate with 200 g of boric acid, the same procedure as Example 1 was carried out to prepare an oxidant dopant agent solution. In Example 12, the quantity of the boric acid in the oxidant dopant agent solution was 3.51% with respect to the ferric naphthalenesulfonate.

Example 13

Except for replacing 300 g of dibutyl phosphate with 200 g of tributyl borate, the same procedure as Example 1 was carried out to prepare an oxidant dopant agent solution. In Example 13, the quantity of the tributyl borate in the oxidant dopant agent solution was 3.51% with respect to the ferric naphthalenesulfonate.

Example 14

Except for replacing 300 g of dibutyl phosphate with 300 g of diethylhexyl phosphate, the same procedure as Example 1 was carried out to prepare an oxidant dopant agent solution. In Example 14, the quantity of the diethylhexyl phosphate in the oxidant dopant agent solution was 5.26% with respect to the ferric naphthalenesulfonate.

Example 15

Except for replacing 300 g of dibutyl phosphate with 200 g of dithiophosphoric acid, the same procedure as Example 1 was carried out to prepare an oxidant dopant agent solution. In Example 15, the quantity of the dithiophosphoric acid in the oxidant dopant agent solution was 3.51% with respect to the ferric naphthalenesulfonate.

Example 16

Except for replacing 300 g of dibutyl phosphate with 200 g of diethylhexyl dithiophosphate, the same procedure as Example 1 was carried out to prepare an oxidant dopant agent solution. In Example 16, the quantity of the diethylhexyl dithiophosphate in the oxidant dopant agent solution was 3.51% with respect to the ferric naphthalenesulfonate.

Example 17

Except for replacing 300 g of dibutyl phosphate with 200 g of thiophosphoric acid, the same procedure as Example 1 was carried out to prepare an oxidant dopant agent solution. In Example 17, the quantity of the thiophosphoric acid in the oxidant dopant agent solution was 3.51% with respect to the ferric naphthalenesulfonate.

Example 18

Except for replacing 300 g of dibutyl phosphate with 300 g of diethyl thiophosphate, the same procedure as Example 1 was carried out to prepare an oxidant dopant agent solution. In Example 18, the quantity of the diethyl thiophosphate in the oxidant dopant agent solution was 5.26% with respect to the ferric naphthalenesulfonate.

Example 19

Except for replacing 300 g of dibutyl phosphate with 200 g of dimethyl phosphate, the same procedure as Example 1 was carried out to prepare an oxidant dopant agent solution. In Example 19, the quantity of the dimethyl phosphate in the oxidant dopant agent solution was 3.51% with respect to the ferric naphthalenesulfonate.

Example 20

Except for replacing 300 g of dibutyl phosphate with 200 g of diethyl phosphate, the same procedure as Example 1 was carried out to prepare an oxidant dopant agent solution. In Example 20, the quantity of the diethyl phosphate in the oxidant dopant agent solution was 3.51% with respect to the ferric naphthalenesulfonate.

Example 21

Except for replacing 300 g of dibutyl phosphate with 250 g of dipropyl phosphate, the same procedure as Example 1 was carried out to prepare an oxidant dopant agent solution. In Example 21, the quantity of the dipropyl phosphate in the oxidant dopant agent solution was 4.39% with respect to the ferric naphthalenesulfonate.

Example 22

Except for replacing 300 g of dibutyl phosphate with 570 g of dibenzyl phosphate, the same procedure as Example 1 was carried out to prepare an oxidant dopant agent solution. In Example 22, the quantity of the dibenzyl phosphate in the oxidant dopant agent solution was 10.00% with respect to the ferric naphthalenesulfonate.

Example 23

Except for replacing 300 g of dibutyl phosphate with 250 g of diphenyl phosphate, the same procedure as Example 1 was carried out to prepare an oxidant dopant agent solution. In Example 23, the quantity of the diphenyl phosphate in the oxidant dopant agent solution was 4.39% with respect to the ferric naphthalenesulfonate.

Example 24

Except for replacing 300 g of dibutyl phosphate with 200 g of dimethyl phosphite, the same procedure as Example 1 was carried out to prepare an oxidant dopant agent solution. In Example 24, the quantity of the dimethyl phosphite in the oxidant dopant agent solution was 3.51% with respect to the ferric naphthalenesulfonate.

Example 25

Except for replacing 300 g of dibutyl phosphate with 200 g of diethyl phosphite, the same procedure as Example 1 was carried out to prepare an oxidant dopant agent solution. In Example 25, the quantity of the diethyl phosphite in the oxidant dopant agent solution was 3.51% with respect to the ferric naphthalenesulfonate.

Example 26

Except for replacing 300 g of dibutyl phosphate with 250 g of dipropyl phosphite, the same procedure as Example 1 was carried out to prepare an oxidant dopant agent solution. In Example 26, the quantity of the dipropyl phosphite in the oxidant dopant agent solution was 4.39% with respect to the ferric naphthalenesulfonate.

Example 27

Except for replacing 300 g of dibutyl phosphate with 350 g of dibenzyl phosphite, the same procedure as Example 1 was carried out to prepare an oxidant dopant agent solution. In Example 27, the quantity of the dibenzyl phosphite in the oxidant dopant agent solution was 6.14% with respect to the ferric naphthalenesulfonate.

Example 28

Except for replacing 300 g of dibutyl phosphate with 300 g of diphenyl phosphite, the same procedure as Example 1 was carried out to prepare an oxidant dopant agent solution. In Example 28, the quantity of the diphenyl phosphite in the oxidant dopant agent solution was 5.26% with respect to the ferric naphthalenesulfonate.

Example 29

Except for replacing 300 g of dibutyl phosphate with 250 g of ethyl phosphate, the same procedure as Example 1 was carried out to prepare an oxidant dopant agent solution. In Example 29, the quantity of the ethyl phosphate in the oxidant dopant agent solution was 4.39% with respect to the ferric naphthalenesulfonate.

Example 30

Except for replacing 300 g of dibutyl phosphate with 250 g of ethyl phosphite, the same procedure as Example 1 was carried out to prepare an oxidant dopant agent solution. In Example 30, the quantity of the ethyl phosphite in the oxidant dopant agent solution was 4.39% with respect to the ferric naphthalenesulfonate.

Comparative Example 1

Without adding 300 g of dibutyl phosphate, the same procedure as Example 1 was carried out to prepare an oxidant dopant agent solution.

In order to evaluate the characteristics of the oxidant dopant agent solutions of Examples 1 to 30 and Comparative Example 1 as prepared above, conductive polymers were prepared by using them, and thereby obtained conductive polymers were used as electrolyte to produce tantalum electrolyte capacitors of Examples 31 to 60 and Comparative Example 2, and then, the properties thereof were measured.

[Evaluation of Tantalum Electrolyte Capacitor (1)]

Example 31

The capacitor element for the tantalum electrolyte capacitor to be used was a tantalum sintered body. It was designed to have a rated voltage of 16V, an ESR of 20 mΩ or less, a capacitance of 150 μF or more, and a leak current of 100 μA or less.

The capacitor element above was immersed in a monomer solution obtained by adding 80 ml of ethanol into 20 ml of a mixture solution of 3,4-ethylenedioxythiophene and butylated ethylenedioxythiophene at a mass ratio of 4:6. After one minute, it was pulled up and dried at room temperature for 10 minutes. Then, the capacitor element above was immersed in an oxidant dopant agent dilution solution obtained by diluting 500 g of the oxidant dopant agent solution of Example 1 with 500 g of ethanol. After 30 seconds, it was pulled up and left at room temperature for 80 minutes to cause a polymerization to form a conductive polymer layer. Then, thereby obtained capacitor element having formed the conductive polymer layer was immersed in pure water. After 30 minutes, it was pulled out to dry it at 105° C. for 30 minutes. The sequential procedure above was repeated ten times. Then, the capacitor element above was immersed in the oxidant dopant agent solution of Example 1. After 30 seconds, it was pulled out and dried at 50° C. for 10 minutes. Then, it was immersed in a mixture solution of 3,4-ethylenedioxythiophene and butylated ethylenedioxythiophene at a mass ratio of 4:6. One minute later, it was pulled out and left at room temperature for 80 minutes to cause polymerization to form a conductive polymer layer. Then, the capacitor element having formed the conductive polymer layer was immersed in pure water. After 30 minutes, it was pulled out and dried at 150° C. for 30 minutes. The sequential procedure above was repeated three times.

Then, the electrolyte layer made of the conductive polymer was covered by carbon paste and silver paste. Then, its outside was surrounded by an exterior material to obtain a tantalum electrolyte capacitor of the Example 1.

Examples 32 to 60 and Comparative Example 2

Except for replacing the oxidant dopant agent solution of Example 1 with each of the oxidant dopant agent solutions of Examples 2 to 30 and Comparative Example 1, the same procedure as Example 31 was carried out by using each oxidant dopant agent solution, thereby obtaining each of tantalum electrolyte capacitors of Examples 32 to 60 and Comparative Example 2.

With respect to the tantalum type electrolyte capacitors of Examples 31 to 60 and Comparative Example 2 as produced above, the ESR and the capacitance were measured, as well as the leakage current was measured. The results are shown in Tables 1 and 2, along with the kinds of the oxidant dopant agent solution used. The explanations below are the measuring methods of the ESR, the capacitance and the leakage current.

ESR:
Using an LCR meter (4284A) made by HEWLETT PACKARD Corporation, it was measured at 100 kHz at a condition of 25° C.

Capacitance:
Using an LCR meter (4284A) made by HEWLETT PACKARD Corporation, it was measured at 120 Hz at a condition of 25° C.

Leakage Current:
A voltage of 16V was applied to the capacitor at 25° C. for 60 seconds. Then, a leakage current was measured with a digital oscilloscope.

In the measurement, ten samples of each Example was used. The values of ESR, as shown in Tables 1 and 2, were obtained by averaging the results of the ten samples while rounding off the number of the second decimal place. The values of capacitance and leakage current, as shown in Tables 1 and 2, were obtained by averaging the results of the ten samples while rounding off the numbers after the decimal point. Also, the kind of the oxidant dopant agent solution used in each of Examples 31 to 60 is expressed by the number of the Example.

TABLE 1

| | Oxidant dopant agent solution | ESR (mΩ) | Capacitance (μF) | Leak current (μA) |
|---|---|---|---|---|
| Example 31 | Example 1 | 15.3 | 160 | 18 |
| Example 32 | Example 2 | 15.0 | 164 | 22 |
| Example 33 | Example 3 | 15.5 | 166 | 25 |
| Example 34 | Example 4 | 15.2 | 162 | 21 |
| Example 35 | Example 5 | 15.6 | 158 | 29 |
| Example 36 | Example 6 | 15.5 | 162 | 17 |
| Example 37 | Example 7 | 15.4 | 157 | 24 |
| Example 38 | Example 8 | 15.0 | 156 | 29 |
| Example 39 | Example 9 | 15.1 | 157 | 30 |
| Example 40 | Example 10 | 15.3 | 159 | 19 |
| Example 41 | Example 11 | 15.5 | 158 | 27 |
| Example 42 | Example 12 | 15.6 | 156 | 25 |
| Example 43 | Example 13 | 15.5 | 156 | 27 |
| Example 44 | Example 14 | 15.4 | 160 | 19 |
| Example 45 | Example 15 | 15.4 | 158 | 24 |
| Example 46 | Example 16 | 15.5 | 160 | 18 |
| Example 47 | Example 17 | 15.2 | 157 | 22 |
| Example 48 | Example 18 | 15.4 | 159 | 19 |

TABLE 1-continued

| | Oxidant dopant agent solution | ESR (mΩ) | Capacitance (μF) | Leak current (μA) |
|---|---|---|---|---|
| Example 49 | Example 19 | 15.1 | 160 | 25 |
| Example 50 | Example 20 | 15.2 | 160 | 22 |

TABLE 2

| | Oxidant dopant agent solution | ESR (mΩ) | Capacitance (μF) | Leak current (μA) |
|---|---|---|---|---|
| Example 51 | Example 21 | 15.3 | 159 | 20 |
| Example 52 | Example 22 | 15.5 | 158 | 15 |
| Example 53 | Example 23 | 15.5 | 158 | 14 |
| Example 54 | Example 24 | 15.2 | 161 | 27 |
| Example 55 | Example 25 | 15.3 | 159 | 23 |
| Example 56 | Example 26 | 15.3 | 160 | 21 |
| Example 57 | Example 27 | 15.6 | 157 | 17 |
| Example 58 | Example 28 | 15.6 | 156 | 17 |
| Example 59 | Example 29 | 15.3 | 161 | 25 |
| Example 60 | Example 30 | 15.3 | 161 | 23 |
| Comp. Ex. 2 | Comp. Ex. 1 | 15.8 | 155 | 1032 |

As shown in Tables 1 and 2, the tantalum type electrolyte capacitors of Examples 31 to 60 (which hereinafter can be simply referred to as "capacitor") had: an ESR of 15.0 to 15.6 mΩ, thereby satisfying the set value of the ESR to be 20 mΩ or less; a capacitance of 156 to 166 μF, thereby satisfying the set value of the capacitance to be 150 μF or more; and a leak current of 14 to 30 μA, thereby satisfying the set value of the leak current to be 100 μA or less. In addition, compared with the capacitor of Comparative Example 2 shown in Table 2, it was found that the leak current was significantly low. In addition, the capacitors of Examples 31 to 60 were superior to the capacitor of Comparative Example 2 with respect to the ESR and the capacitance. Without causing the characteristic drops in the ESR and the capacitance, they could accomplish a significant reduction of the leak current in comparison with the capacitor of Comparative Example 2.

[Preparation of Oxidant Dopant Agent Solution for Conductive Polymer Preparation (2)]

Regarding the preparation (2) of the oxidant dopant agent for conductive polymer preparation solution (which can be hereinafter simplifies as "oxidant dopant agent solution"), the oxidant dopant agent solution of Examples 61 to 91 and the oxidant dopant agent solution of Comparative Examples 3 and 4 are shown. These oxidant dopant agent solutions were used in the production of winding-type aluminum electrolyte capacitors of Examples 92 to 122 and Comparative Examples 5 and 6, as described later.

Example 61

5.7 kg of ferric naphthalenesulfonate (a molar ratio of 1:2.70 for iron versus naphthalenesulfonic acid) was dissolved to prepare 10 kg of an ethanol solution (1% of water content).

Then, 10 kg of the ethanol solution of the ferric naphthalenesulfonate above was put into a reaction vessel having an internal volume of 20 L, into which 300 g of dibutyl phosphate and 1 kg of glycerin diglycidyl ether were added. Then, there was heated such that the temperature of the contents reached 80° C., and a reflux was continued for one hour to prepare an oxidant dopant agent solution.

In Example 61, the quantity of the dibutyl phosphate in the oxidant dopant agent solution was 5.26% with respect to the ferric naphthalenesulfonate, and the quantity of the glycerin diglycidyl ether was 17.54% with respect to the ferric naphthalenesulfonate.

Example 62

Except that replacing with 10 kg of the ethanol solution in which 5.7 kg of ferric naphthalenesulfonate was dissolved, 10 kg of an ethanol solution (1% of water content) in which 4.7 kg of ferric naphthalenesulfonate (a molar ratio of 1:2.70 for iron versus naphthalenesulfonic acid) and 1 kg of ferric methanesulfonate (a molar ratio of 1:2.70 for iron versus methane sulfonic acid) was used. Other than the above, the same procedure as Example 61 was carried out to prepare an oxidant dopant agent solution.

In Example 62, 300 g of dibutyl phosphate and 1 kg of glycerin diglycidyl ether were contained in the oxidant dopant agent solution in the same manner as Example 61. The quantity of the dibutyl phosphate was 5.26% with respect to the organic ferric sulfonate constituted by ferric naphthalenesulfonate and ferric methanesulfonate, and the quantity of the glycerin diglycidyl ether was 17.54% with respect to the organic ferric sulfonate constituted by ferric naphthalenesulfonate and ferric methanesulfonate.

Example 63

Except that replacing with 10 kg of the ethanol solution in which 5.7 kg of ferric naphthalenesulfonate was dissolved, 10 kg of an ethanol solution (1% of water content) in which 4.7 kg of ferric p-toluenesulfonate (a molar ratio of 1:2.70 for iron versus p-toluenesulfonic acid) and 1 kg of ferric methanesulfonate (a molar ratio of 1:2.70 for iron versus methane sulfonic acid) was used. Other than the above, the same procedure as Example 61 was carried out to prepare an oxidant dopant agent solution.

In Example 63, 300 g of dibutyl phosphate and 1 kg of glycerin diglycidyl ether were contained in the oxidant dopant agent solution in the same manner as Example 61. The quantity of the dibutyl phosphate was 5.26% with respect to the organic ferric sulfonate constituted by ferric p-toluenesulfonate and ferric methanesulfonate, and the quantity of the glycerin diglycidyl ether was 17.54% with respect to the organic ferric sulfonate constituted by ferric p-toluenesulfonate and ferric methanesulfonate.

Example 64

Except that replacing with 10 kg of the ethanol solution in which 5.7 kg of ferric naphthalenesulfonate was dissolved, 10 kg of an ethanol solution (1% of water content) in which 4.7 kg of ferric naphthalenesulfonate (a molar ratio of 1:2.70 for iron versus naphthalenesulfonic acid) and 1 kg of ferric p-toluenesulfonate (a molar ratio of 1:2.70 for iron versus p-toluenesulfonic acid) was used. Other than the above, the same procedure as Example 61 was carried out to prepare an oxidant dopant agent solution.

In Example 64, 300 g of dibutyl phosphate and 1 kg of glycerin diglycidyl ether were contained in the oxidant dopant agent solution in the same manner as Example 61. The quantity of the dibutyl phosphate was 5.26% with respect to the organic ferric sulfonate constituted by ferric naphthalenesulfonate and ferric p-toluenesulfonate, and the quantity of the glycerin diglycidyl ether was 17.54% with respect to the organic ferric sulfonate constituted by ferric naphthalenesulfonate and ferric p-toluenesulfonate.

Example 65

Except for replacing 300 g of dibutyl phosphate and 1 kg of glycerin diglycidyl ether with 300 g of diethylhexyl phosphate and 1 kg of cresyl glycidyl ether, the same procedure as Example 61 was carried out to prepare an oxidant dopant agent solution.

In Example 65, the quantity of the diethylhexyl phosphate in the oxidant dopant agent solution was 5.26% with respect to the ferric naphthalenesulfonate, and the quantity of the cresyl glycidyl ether was 17.54% with respect to the ferric naphthalenesulfonate.

Example 66

Except for replacing 300 g of dibutyl phosphate and 1 kg of glycerin diglycidyl ether with 300 g of diethylhexyl phosphate and 1 kg of glycidyl methacrylate, the same procedure as Example 61 was carried out to prepare an oxidant dopant agent solution.

In Example 66, the quantity of the diethylhexyl phosphate in the oxidant dopant agent solution was 5.26% with respect to the ferric naphthalenesulfonate, and the quantity of the glycidyl methacrylate was 17.54% with respect to the ferric naphthalenesulfonate.

Example 67

Except for replacing 300 g of dibutyl phosphate and 1 kg of glycerin diglycidyl ether with 300 g of diethylhexyl phosphate, 500 g of glycidyl methacrylate and 500 g of 2-(3,4-epoxycyclohexyl)ethyltrimethoxysilane, the same procedure as Example 61 was carried out to prepare an oxidant dopant agent solution.

In Example 67, the quantity of the diethylhexyl phosphate in the oxidant dopant agent solution was 5.26% with respect to the ferric naphthalenesulfonate; and the quantity of the glycidyl methacrylate was 8.77% with respect to the ferric naphthalenesulfonate; and the quantity of the 2-(3,4-epoxycyclohexyl)ethyltrimethoxysilane was 8.77% with respect to the ferric naphthalenesulfonate.

Example 68

Except for replacing 300 g of dibutyl phosphate with 500 g of dibutyl phosphate, the same procedure as Example 61 was carried out to prepare an oxidant dopant agent solution.

In Example 68, the quantity of the dibutyl phosphate in the oxidant dopant agent solution was 8.77% with respect to the ferric naphthalenesulfonate. Also, in Example 68, 1 kg of glycerin diglycidyl ether was contained in the oxidant dopant agent solution in the same manner as Example 61. The quantity of the glycerin diglycidyl ether was 17.54% with respect to the ferric naphthalenesulfonate.

Example 69

Except for replacing 300 g of dibutyl phosphate with 100 g of dibutyl phosphate, the same procedure as Example 61 was carried out to prepare an oxidant dopant agent solution.

In Example 69, the quantity of the dibutyl phosphate in the oxidant dopant agent solution was 1.75% with respect to the ferric naphthalenesulfonate. Also, in Example 69, 1 kg of glycerin diglycidyl ether was contained in the oxidant dopant agent solution in the same manner as Example 61. The quantity of the glycerin diglycidyl ether was 17.54% with respect to the ferric naphthalenesulfonate.

Example 70

Except for replacing 300 g of dibutyl phosphate with 200 g of phosphoric acid, the same procedure as Example 61 was carried out to prepare an oxidant dopant agent solution.

In Example 70, the quantity of the phosphoric acid in the oxidant dopant agent solution was 3.51% with respect to the ferric naphthalenesulfonate. Also, in Example 70, 1 kg of glycerin diglycidyl ether was contained in the oxidant dopant agent solution in the same manner as Example 61. The quantity of the glycerin diglycidyl ether was 17.54% with respect to the ferric naphthalenesulfonate.

Example 71

Except for replacing 300 g of dibutyl phosphate with 200 g of phosphorous acid, the same procedure as Example 61 was carried out to prepare an oxidant dopant agent solution.

In Example 71, the quantity of the phosphorous acid in the oxidant dopant agent solution was 3.51% with respect to the ferric naphthalenesulfonate. Also, in Example 71, 1 kg of glycerin diglycidyl ether was contained in the oxidant dopant agent solution in the same manner as Example 61. The quantity of the glycerin diglycidyl ether was 17.54% with respect to the ferric naphthalenesulfonate.

Example 72

Except for replacing 300 g of dibutyl phosphate with 300 g of dibutyl phosphite, the same procedure as Example 61 was carried out to prepare an oxidant dopant agent solution.

In Example 72, the quantity of the dibutyl phosphite in the oxidant dopant agent solution was 5.26% with respect to the ferric naphthalenesulfonate. Also, in Example 72, 1 kg of glycerin diglycidyl ether was contained in the oxidant dopant agent solution in the same manner as Example 61. The quantity of the glycerin diglycidyl ether was 17.54% with respect to the ferric naphthalenesulfonate.

Example 73

Except for replacing 300 g of dibutyl phosphate with 300 g of tributyl phosphite, the same procedure as Example 61 was carried out to prepare an oxidant dopant agent solution.

In Example 73, the quantity of the tributyl phosphite in the oxidant dopant agent solution was 5.26% with respect to the ferric naphthalenesulfonate. Also, in Example 73, 1 kg of glycerin diglycidyl ether was contained in the oxidant dopant agent solution in the same manner as Example 61. The quantity of the glycerin diglycidyl ether was 17.54% with respect to the ferric naphthalenesulfonate.

Example 74

Except for replacing 300 g of dibutyl phosphate with 200 g of boric acid, the same procedure as Example 61 was carried out to prepare an oxidant dopant agent solution.

In Example 74, the quantity of the boric acid in the oxidant dopant agent solution was 3.51% with respect to the ferric naphthalenesulfonate. Also, in Example 74, 1 kg of glycerin diglycidyl ether was contained in the oxidant dopant agent solution in the same manner as Example 61. The quantity of the glycerin diglycidyl ether was 17.54% with respect to the ferric naphthalenesulfonate.

Example 75

Except for replacing 300 g of dibutyl phosphate and 1 kg of glycerin diglycidyl ether with 300 g of tributyl phosphate and 1 kg of glycidyl methacrylate, the same procedure as Example 61 was carried out to prepare an oxidant dopant agent solution.

In Example 75, the quantity of the tributyl phosphate in the oxidant dopant agent solution was 5.26% with respect to the ferric naphthalenesulfonate, and the quantity of the glycidyl methacrylate was 17.54% with respect to the ferric naphthalenesulfonate.

Example 76

Except for replacing 300 g of dibutyl phosphate and 1 kg of glycerin diglycidyl ether with 200 g of dithiophosphoric acid and 1 kg of 2-(3,4-epoxycyclohexyl)ethyltrimethoxysilane, the same procedure as Example 61 was carried out to prepare an oxidant dopant agent solution.

In Example 76, the quantity of the dithiophosphoric acid in the oxidant dopant agent solution was 3.51% with respect to the ferric naphthalenesulfonate; and the quantity of the 2-(3,4-epoxycyclohexyl)ethyltrimethoxysilane was 17.54% with respect to the ferric naphthalenesulfonate.

Example 77

Except for replacing 300 g of dibutyl phosphate and 1 kg of glycerin diglycidyl ether with 200 g of diethylhexyl dithiophosphate and 1 kg of 2-(3,4-epoxycyclohexyl)ethyltrimethoxysilane, the same procedure as Example 61 was carried out to prepare an oxidant dopant agent solution.

In Example 77, the quantity of the diethylhexyl dithiophosphate in the oxidant dopant agent solution was 3.51% with respect to the ferric naphthalenesulfonate; and the quantity of the 2-(3,4-epoxycyclohexyl)ethyltrimethoxysilane was 17.54% with respect to the ferric naphthalenesulfonate.

Example 78

Except for replacing 300 g of dibutyl phosphate and 1 kg of glycerin diglycidyl ether with 200 g of thiophosphoric acid and 1 kg of 2-(3,4-epoxycyclohexyl)ethyltrimethoxysilane, the same procedure as Example 61 was carried out to prepare an oxidant dopant agent solution.

In Example 78, the quantity of the thiophosphoric acid in the oxidant dopant agent solution was 3.51% with respect to the ferric naphthalenesulfonate; and the quantity of the 2-(3,4-epoxycyclohexyl)ethyltrimethoxysilane was 17.54% with respect to the ferric naphthalenesulfonate.

Example 79

Except for replacing 300 g of dibutyl phosphate and 1 kg of glycerin diglycidyl ether with 300 g of diethyl thiophosphate and 1 kg of 2-(3,4-epoxycyclohexyl)ethyltrimethoxysilane, the same procedure as Example 61 was carried out to prepare an oxidant dopant agent solution.

In Example 79, the quantity of the diethyl thiophosphate in the oxidant dopant agent solution was 5.26% with respect to the ferric naphthalenesulfonate; and the quantity of the 2-(3,4-epoxycyclohexyl)ethyltrimethoxysilane was 17.54% with respect to the ferric naphthalenesulfonate.

Example 80

Except for replacing 300 g of dibutyl phosphate and 1 kg of glycerin diglycidyl ether with 200 g of dimethyl phosphate and 1 kg of 3-glycidoxypropyltrimethoxysilane, the same procedure as Example 61 was carried out to prepare an oxidant dopant agent solution.

In Example 80, the quantity of the dimethyl phosphate in the oxidant dopant agent solution was 3.51% with respect to the ferric naphthalenesulfonate, and the quantity of the 3-glycidoxypropyltrimethoxysilane was 17.54% with respect to the ferric naphthalenesulfonate.

Example 81

Except for replacing 300 g of dibutyl phosphate and 1 kg of glycerin diglycidyl ether with 200 g of diethyl phosphate and 1 kg of epoxy polysiloxane "X-41-1053" (product name) manufactured by Shin-etsu Chemistry Co., Ltd., the same procedure as Example 61 was carried out to prepare an oxidant dopant agent solution.

In Example 81, the quantity of the diethyl phosphate in the oxidant dopant agent solution was 3.51% with respect to the ferric naphthalenesulfonate; and the quantity of the epoxy polysiloxane "X-41-1053" (product name) was 17.54% with respect to the ferric naphthalenesulfonate.

Example 82

Except for replacing 300 g of dibutyl phosphate and 1 kg of glycerin diglycidyl ether with 250 g of dipropyl phosphate and 1 kg of epoxy polysiloxane "X-41-1056" (product name) manufactured by Shin-etsu Chemistry Co., Ltd., the same procedure as Example 61 was carried out to prepare an oxidant dopant agent solution.

In Example 82, the quantity of the dipropyl phosphate in the oxidant dopant agent solution was 4.39% with respect to the ferric naphthalenesulfonate; and the quantity of the epoxy polysiloxane "X-41-1056" (product name) was 17.54% with respect to the ferric naphthalenesulfonate.

Example 83

Except for replacing 300 g of dibutyl phosphate and 1 kg of glycerin diglycidyl ether with 570 g of dibenzyl phosphate and 1 kg of 2-(3,4-epoxycyclohexyl)ethyltrimethoxysilane, the same procedure as Example 61 was carried out to prepare an oxidant dopant agent solution.

In Example 83, the quantity of the dibenzyl phosphate in the oxidant dopant agent solution was 10.00% with respect to the ferric naphthalenesulfonate; and the quantity of the 2-(3,4-epoxycyclohexyl)ethyltrimethoxysilane was 17.54% with respect to the ferric naphthalenesulfonate.

Example 84

Except for replacing 300 g of dibutyl phosphate and 1 kg of glycerin diglycidyl ether with 250 g of diphenyl phosphate and 1 kg of 2-(3,4-epoxycyclohexyl)ethyltrimethoxysilane, the same procedure as Example 61 was carried out to prepare an oxidant dopant agent solution.

In Example 84, the quantity of the diphenyl phosphate in the oxidant dopant agent solution was 4.39% with respect to the ferric naphthalenesulfonate; and the quantity of the 2-(3,4-epoxycyclohexyl)ethyltrimethoxysilane was 17.54% with respect to the ferric naphthalenesulfonate.

Example 85

Except for replacing 300 g of dibutyl phosphate and 1 kg of glycerin diglycidyl ether with 200 g of dimethyl phosphite and 1 kg of 2-(3,4-epoxycyclohexyl)ethyltrimethoxysilane, the same procedure as Example 61 was carried out to prepare an oxidant dopant agent solution.

In Example 85, the quantity of the dimethyl phosphite in the oxidant dopant agent solution was 3.51% with respect to the ferric naphthalenesulfonate; and the quantity of the 2-(3,4-epoxycyclohexyl)ethyltrimethoxysilane was 17.54% with respect to the ferric naphthalenesulfonate.

Example 86

Except for replacing 300 g of dibutyl phosphate and 1 kg of glycerin diglycidyl ether with 200 g of diethyl phosphite and 1 kg of 2-(3,4-epoxycyclohexyl)ethyltrimethoxysilane, the same procedure as Example 61 was carried out to prepare an oxidant dopant agent solution.

In Example 86, the quantity of the diethyl phosphite in the oxidant dopant agent solution was 3.51% with respect to the ferric naphthalenesulfonate; and the quantity of the 2-(3,4-epoxycyclohexyl)ethyltrimethoxysilane was 17.54% with respect to the ferric naphthalenesulfonate.

Example 87

Except for replacing 300 g of dibutyl phosphate and 1 kg of glycerin diglycidyl ether with 250 g of dipropyl phosphite and 1 kg of 2-(3,4-epoxycyclohexyl)ethyltrimethoxysilane, the same procedure as Example 61 was carried out to prepare an oxidant dopant agent solution.

In Example 87, the quantity of the dipropyl phosphite in the oxidant dopant agent solution was 4.39% with respect to the ferric naphthalenesulfonate; and the quantity of the 2-(3,4-epoxycyclohexyl)ethyltrimethoxysilane was 17.54% with respect to the ferric naphthalenesulfonate.

Example 88

Except for replacing 300 g of dibutyl phosphate and 1 kg of glycerin diglycidyl ether with 350 g of dibenzyl phosphite and 1 kg of 2-(3,4-epoxycyclohexyl)ethyltrimethoxysilane, the same procedure as Example 61 was carried out to prepare an oxidant dopant agent solution.

In Example 88, the quantity of the dibenzyl phosphite in the oxidant dopant agent solution was 6.14% with respect to the ferric naphthalenesulfonate; and the quantity of the 2-(3,4-epoxycyclohexyl)ethyltrimethoxysilane was 17.54% with respect to the ferric naphthalenesulfonate.

Example 89

Except for replacing 300 g of dibutyl phosphate and 1 kg of glycerin diglycidyl ether with 300 g of diphenyl phosphite and 1 kg of 2-(3,4-epoxycyclohexyl)ethyltrimethoxysilane, the same procedure as Example 61 was carried out to prepare an oxidant dopant agent solution.

In Example 89, the quantity of the diphenyl phosphite in the oxidant dopant agent solution was 5.26% with respect to the ferric naphthalenesulfonate; and the quantity of the 2-(3,4-epoxycyclohexyl)ethyltrimethoxysilane was 17.54% with respect to the ferric naphthalenesulfonate.

Example 90

Except for replacing 300 g of dibutyl phosphate and 1 kg of glycerin diglycidyl ether with 250 g of ethyl phosphate and 1 kg of 2-(3,4-epoxycyclohexyl)ethyltrimethoxysilane, the same procedure as Example 61 was carried out to prepare an oxidant dopant agent solution.

In Example 90, the quantity of the ethyl phosphate in the oxidant dopant agent solution was 4.39% with respect to the ferric naphthalenesulfonate; and the quantity of the 2-(3,4-epoxycyclohexyl)ethyltrimethoxysilane was 17.54% with respect to the ferric naphthalenesulfonate.

Example 91

Except for replacing 300 g of dibutyl phosphate and 1 kg of glycerin diglycidyl ether with 250 g of ethyl phosphite and 1 kg of 2-(3,4-epoxycyclohexyl)ethyltrimethoxysilane, the same procedure as Example 61 was carried out to prepare an oxidant dopant agent solution.

In Example 91, the quantity of the ethyl phosphite in the oxidant dopant agent solution was 4.39% with respect to the ferric naphthalenesulfonate; and the quantity of the 2-(3,4-epoxycyclohexyl)ethyltrimethoxysilane was 17.54% with respect to the ferric naphthalenesulfonate.

Comparative Example 3

There was prepared 10 kg of an ethanol solution (1% of water content) including ferric naphthalenesulfonate (a molar ratio of 1:2.70 for iron versus naphthalenesulfonic acid) at a concentration of 57%, which was used as an oxidant dopant agent solution as Comparative Example 3. The oxidant dopant agent solution of Comparative Example 3 was used to produce a winding-type aluminum electrolyte capacitor, and its composition was the same as the oxidant dopant agent solution of Comparative Example 1. When the oxidant dopant agent solution of Example 61 is compared with the oxidant dopant agent solution of Comparative Example 3, the oxidant dopant agent solution of Comparative Example 3 did not include dibutyl phosphate nor glycerin diglycidyl ether.

Comparative Example 4

Without adding 300 g of dibutyl phosphate, the same procedure as Example 61 was carried out to prepare an oxidant dopant agent solution. In Comparative Example 4, the oxidant dopant agent solution contained 17.54% of glycerin diglycidyl ether with respect to the ferric naphthalenesulfonate in the same manner as the oxidant dopant agent solution of Example 61, but it did not contain dibutyl phosphate.

In order to evaluate the characteristics of the oxidant dopant agent solutions of Examples 61 to 91 and Comparative Examples 3 and 4 as prepared above, conductive polymers were prepared by using them, and thereby obtained conductive polymers were used as electrolyte to produce winding-type aluminum electrolyte capacitors of Examples 92 to 122 and Comparative Examples 5 and 6, and then, the properties thereof were measured.

[Evaluation of Winding-Type Aluminum Electrolyte Capacitor (1)]

Example 92

In Example 92, a conductive polymer was prepared by using the oxidant dopant agent solution of Example 61, and then, a winding-type aluminum electrolyte capacitor was prepared by using the conductive polymer as an electrolyte.

A surface of an aluminum foil was applied to an etching treatment. Then, the aluminum foil after the etching treatment was immersed in a 12% ammonium aqueous solution. Then, the aluminum foil in the ammonium aqueous solution was applied to a voltage of 75V to form a dielectric layer made of an oxide film of aluminum on the surface of the aluminum foil to serve as a positive electrode. A lead terminal was attached to the positive electrode. Also, a lead terminal was attached to a negative electrode made of an aluminum foil. These positive electrode and negative electrode having lead terminals were wound with an intervention of a separator to manufacture a capacitor element. The capacitor element manufactured here was a winding-type aluminum electrolyte capacitor having a set value of the ESR to be 30 mΩ or less, a set value of the capacitance to be 50 μF or more, a setting value of the leak current to be 100 μA or less, and a set value of the breakdown voltage to be 50V or more.

The capacitor element above was immersed in a monomer solution obtained by adding 80 ml of ethanol into 20 ml of a mixture solution of 3,4-ethylenedioxythiophene and butylated ethylenedioxythiophene at a mass ratio of 4:6. After one minute, it was pulled up and dried at 50° C. for 10 minutes. Then, the capacitor element above was immersed in 100 ml of the oxidant dopant agent solution of Example 61 for 15 seconds. After pulling it up, it was heated at 70° C. for two hours and then at 180° C. for one hour to polymerize the monomers, thereby forming an electrolyte layer of a conductive polymer having a polymer backbone of a copolymer of 3,4-ethylenedioxythiophene and butylated ethylenedioxythiophene. Then, the outer surface was surrounded by an exterior material to obtain a winding-type aluminum electrolyte capacitor of Example 92.

Examples 93 to 122 and Comparative Examples 5 and 6

Except for replacing the oxidant dopant agent solution of Example 61 with each of the oxidant dopant agent solutions of Examples 62 to 91 and Comparative Examples 3 and 4, the same procedure as Example 92 was carried out by using each oxidant dopant agent solution, thereby obtaining each of winding-type aluminum electrolyte capacitors of Examples 93 to 122 and Comparative Examples 5 and 6.

Regarding the winding-type aluminum electrolyte capacitors of Examples 92 to 122 and Comparative Examples 5 and 6 (hereinafter, which can be simply called as "capacitor"), the ESR, the capacitance, the leakage current and the breakdown voltage were measured. The results are shown in Tables 3 and 4. In addition, the methods for measurements of the ESR, the capacitance and the leak current were the same as described before. The manner shown in Tables 3 and 4 are the same as described in Table 1, except for the ESR shown by rounding off to an integer. The breakdown voltage was measured by using PRk650-2.5 manufactured by Matsusada Precision Inc. at a condition of 25° C. while raising the voltage at a speed of 1V/m. Each example was measured for ten samples, and the value of the breakdown voltage shown in Tables 3 and 4 is an average of the ten samples while rounding off to an integer.

TABLE 3

| | Oxidant dopant agent solution | ESR (mΩ) | Capacitance (μF) | Leak current (μA) | Breakdown voltage (V) |
|---|---|---|---|---|---|
| Example 92 | Example 61 | 19 | 53 | 5 | 72 |
| Example 93 | Example 62 | 17 | 54 | 12 | 70 |
| Example 94 | Example 63 | 19 | 55 | 20 | 69 |
| Example 95 | Example 64 | 18 | 54 | 12 | 71 |
| Example 96 | Example 65 | 19 | 53 | 5 | 71 |
| Example 97 | Example 66 | 17 | 54 | 6 | 72 |
| Example 98 | Example 67 | 17 | 55 | 6 | 72 |
| Example 99 | Example 68 | 19 | 54 | 5 | 71 |
| Example 100 | Example 69 | 18 | 52 | 16 | 69 |
| Example 101 | Example 70 | 19 | 55 | 21 | 69 |
| Example 102 | Example 71 | 19 | 54 | 20 | 69 |
| Example 103 | Example 72 | 19 | 55 | 7 | 71 |
| Example 104 | Example 73 | 19 | 54 | 21 | 69 |
| Example 105 | Example 74 | 19 | 52 | 21 | 69 |
| Example 106 | Example 75 | 19 | 53 | 19 | 69 |
| Example 107 | Example 76 | 20 | 54 | 18 | 70 |
| Example 108 | Example 77 | 19 | 53 | 5 | 70 |
| Example 109 | Example 78 | 20 | 55 | 20 | 71 |
| Example 110 | Example 79 | 19 | 53 | 7 | 70 |
| Example 111 | Example 80 | 17 | 55 | 6 | 72 |
| Example 112 | Example 81 | 18 | 54 | 4 | 72 |

TABLE 4

| | Oxidant dopant agent solution | ESR (mΩ) | Capacitance (μF) | Leak current (μA) | Breakdown voltage (V) |
|---|---|---|---|---|---|
| Example 113 | Example 82 | 18 | 53 | 4 | 72 |
| Example 114 | Example 83 | 20 | 52 | 4 | 71 |
| Example 115 | Example 84 | 20 | 52 | 3 | 72 |
| Example 116 | Example 85 | 17 | 55 | 8 | 70 |
| Example 117 | Example 86 | 18 | 54 | 7 | 70 |
| Example 118 | Example 87 | 19 | 53 | 5 | 71 |
| Example 119 | Example 88 | 20 | 52 | 4 | 71 |
| Example 120 | Example 89 | 20 | 52 | 4 | 72 |
| Example 121 | Example 90 | 17 | 54 | 17 | 69 |
| Example 122 | Example 91 | 17 | 54 | 16 | 69 |
| Comp. Ex. 5 | Comp. Ex. 3 | 20 | 52 | 970 | 35 |
| Comp. Ex. 6 | Comp. Ex. 4 | 22 | 49 | 450 | 65 |

As shown in Tables 3 and 4, the capacitors of Examples 92 to 122 had: an ESR of 17 to 20 mΩ, thereby satisfying the set value of the ESR to be 30 mΩ or less; a capacitance of 52 to 55 μF, thereby satisfying the set value of the capacitance to be 50 μF or more; a leak current of 3 to 21 μA, thereby satisfying the set value of the leak current to be 100 μA or less; and a breakdown voltage of 69 to 72V, thereby satisfying the set value of the breakdown voltage of 50V or more. In addition, these capacitors had a lower leak current than the capacitors of Comparative Examples 5 and 6 as shown in Table 4.

Also, the capacitor of this Examples of 92 to 122 had an ESR equivalent to, or lower than, the capacitors of Comparative Examples 5 and 6, and a capacitance equivalent to, or higher than, the capacitors of Comparative Examples 5 and 6. Therefore, without bringing about a characteristic drop in the ESR and the capacitance, the leak current can be significantly reduced in comparison with the capacitors of Comparative Examples 5 and 6.

Also, regarding the breakdown voltage, the capacitors of Examples 92 to 122 were high. Even in the winding-type aluminum electrolyte capacitors that are demanded to satisfy the requirement to be superior in the withstanding voltage property, it was found that such a requirement could be met in the winding-type aluminum electrolyte capacitors prepared by using an electrolyte of the conductive polymer when it was prepared by using the oxidant dopant agent of the present invention.

[Evaluation of the Winding-Type Aluminum Electrolyte Capacitor (2)]

In this evaluation (2) of the winding-type aluminum electrolyte capacitors, the capacitor characteristics of the winding-type aluminum electrolyte capacitors of Examples 123 to 125 were evaluated, which were different in the monomers from the winding-type aluminum electrolyte capacitors of the evaluation (1).

Example 123

Except for replacing the monomer mixture solution of 3,4-ethylenedioxythiophene and butylated ethylenedioxythiophene at a mass ratio of 4:6 with butylated ethylenedioxythiophene alone as a monomer, the same procedure as Example 92 was carried out to produce a winding-type aluminum electrolytic capacitor as Example 123.

Example 124

Except for replacing the monomer mixture solution of 3,4-ethylenedioxythiophene and butylated ethylenedioxythiophene at a mass ratio of 4:6 with butylated ethylenedioxythiophene alone as a monomer, the same procedure as Example 97 was carried out to produce a winding-type aluminum electrolytic capacitor as Example 124.

Example 125

Except for replacing the monomer mixture solution of 3,4-ethylenedioxythiophene and butylated ethylenedioxythiophene at a mass ratio of 4:6 with butylated ethylenedioxythiophene alone as a monomer, the same procedure as Example 98 was carried out to produce a winding-type aluminum electrolytic capacitor as Example 125.

Comparative Example 7

Except for replacing the oxidant dopant agent solution of Example 61 with the oxidant dopant agent solutions of Comparative Example 3, the same procedure as Example 123 was carried out to prepare a winding-type aluminum electrolyte capacitor of Comparative Example 7.

Comparative Example 8

Except for replacing the oxidant dopant agent solution of Example 61 with the oxidant dopant agent solutions of Comparative Example 4, the same procedure as Example 123 was carried out to prepare a winding-type aluminum electrolyte capacitor of Comparative Example 8.

Regarding the winding-type aluminum electrolyte capacitors of Examples 123 to 125 and Comparative Examples 7 and 8 (hereinafter, which can be simply called as "capacitor"), the ESR, the capacitance, the leakage current and the breakdown voltage were measured. The results are shown in Table 5. In addition, the methods for measuring the ESR, the capacitance, the leak current and the breakdown voltage were the same as described before. The manner shown in Table 5 is the same as described in Table 3.

TABLE 5

| | Oxidant dopant agent solution | ESR (mΩ) | Capacitance (µF) | Leak current (µA) | Breakdown voltage (V) |
|---|---|---|---|---|---|
| Example 123 | Example 61 | 20 | 52 | 1 | 72 |
| Example 124 | Example 66 | 20 | 52 | 1 | 74 |
| Example 125 | Example 67 | 20 | 52 | 1 | 74 |
| Comp. Ex. 7 | Comp. Ex. 3 | 22 | 51 | 521 | 41 |
| Comp. Ex. 8 | Comp. Ex. 4 | 24 | 48 | 423 | 67 |

As shown in Table 5, the capacitors of Examples 123 to 125 each had: an ESR of 20 mΩ, thereby satisfying the set value of the ESR to be 30 mΩ or less; a capacitance of 52 µF, thereby satisfying the set value of the capacitance to be 50 µF or more; a leak current of 1 µA, thereby satisfying the set value of the leak current to be 100 µA or less; and a breakdown voltage of 72 to 74V, thereby satisfying the set value of the breakdown voltage of 50V or more. In addition, these capacitors had a lower leak current than the capacitors of Comparative Examples 7 and 8.

Also, the capacitors of Examples of 123 to 125 had an ESR slightly lower than the capacitors of Comparative Examples 7 and 8, and a capacitance slightly higher than the capacitors of Comparative Examples 7 and 8. Therefore, without bringing about a characteristic drop in the ESR and the capacitance, the leak current can be significantly reduced in comparison with the capacitors of Comparative Examples 7 and 8.

Also, regarding the breakdown voltage, the capacitors of Examples 123 to 125 were high. Even in the winding-type aluminum electrolyte capacitors that are demanded to satisfy the requirement to be superior in the withstanding voltage property, it was found that such a requirement could be met.

Furthermore, the following comparisons are made between the Examples in which the same oxidant dopant agent solution was use. The capacitor of Example 123 had less leak current than the capacitor of Example 92, both using the oxidant dopant agent solution of Example 61 in the same manner. The capacitor of Example 124 had less leak current than the capacitor of Example 97, both using the oxidant dopant agent solution of Example 66 in the same manner. The capacitor of Example 125 had less leak current than the capacitor of Example 98, both using the oxidant dopant agent solution of Example 67 in the same manner. In other words, the capacitors of Example 123, Example 124 and Example 125 used only butylated ethylenedioxythiophene as a monomer, whereas the capacitor of Example 92, Example 97 and Example 98 used the mixture solution of 3,4-ethylenedioxythiophene and butylated ethylenedioxythiophene at a mass ratio of 4:6 as a monomer, and the formers had a leak current lower than the latters.

[Evaluation of Tantalum Electrolyte Capacitor (2)]

In Examples 31 to 60 described before, the oxidant dopant agent solutions of Examples 1 to 30 of the present invention were used to carry out so-called the "on-site polymerization" to form conductive polymer layers on a capacitor element, which were used as electrolyte to produce the tantalum electrolyte capacitors. Their characteristic evaluations were shown as the evaluation (1) of the tantalum electrolyte capacitor. By contrast, in the evaluation (2) of the tantalum electrolyte capacitor, a first electrolyte layer of a conductive polymer layer was formed on a capacitor element by means of so-called "on-site polymerization" by using the oxidant dopant agent solution of Example 1 of the present invention; and then, on the first electrolyte layer, a second electrolyte layer, or a second and a third electrolyte layers, i.e., conductive polymer layer(s) formed by using a π conjugated system conductive polymer dispersion liquid, thereby producing a tantalum electrolyte capacitor, and evaluating the characteristics thereof.

Then, prior to describing the Examples, Production Examples of π conjugated system conductive polymer dispersion liquid [I] and [II], which were used in the Examples, are described first.

Preparation Example of Conductive Polymer Dispersion Liquid (I)

1 L of pure water was added into a separable flask with a stirrer with an internal volume of 2 L, into which 170 g of sodium styrenesulfonate and 30 g of hydroxyethyl acrylate were added. Then, 1 g of ammonium persulfate as an oxidant was added into the solution. There, a polymerization reaction of styrenesulfonic acid and hydroxyethyl acrylate was carried out for 12 hours. The reaction liquid after the polymerization was treated with an ultrafiltration device [VIVAFLOW 200 (product name) made by Sartorius Corporation, at a condition of a molecular weight fraction of 50,000] to remove free components having low molecular weights in the liquid. Then, water was added there to adjust the concentration into 3%.

With respect to the copolymer of styrenesulfonic acid and hydroxyethyl acrylate as obtained above, the weight average molecular weight was estimated by using a gel filtration column. As a result, it was estimated as 180,000 based on dextran as a calibration standard.

600 g of a 3% aqueous solution of the copolymer of styrenesulfonic acid and hydroxyethyl acrylate was put in a stainless steel container with an internal volume of 1 L, into which 0.3 g of ferrous sulfate having 7 hydrates was added. Then, 4 mL of 3,4-ethylenedioxythiophene was gradually dropped there.

They were stirred with a stirrer blade made of stainless steel, and a positive electrode was attached to the container, and a negative electrode was attached to the base of the stirrer blade. A constant current of 1 mA/cm2 was applied to carryout an electrolytic oxidation polymerization for 18 hours. After the electrolytic oxidation polymerization above, the mixture was diluted with 6 times of water. Then, a dispersion treatment was carried out by using an ultrasonic homogenizer [Nippon Seiki Co., Ltd., US-T300 (product name)] for two hours. Then, 100 g of cation exchange resin [AMBERLITE 120B (product name)] manufactured by Organo Corporation was added, and the mixture was stirred for one hour. Then, the mixture was filtered with a filter paper No. 131 manufactured by Toyo Roshi Kaisha, Ltd. The treatments by the cation exchange resin followed by the filtration were repeated three times to remove all the cationic components, such as iron ions, in the liquid.

Thereby treated liquid was filtered with a filter having a pore size of 1 μm. The filtered liquid was treated with an ultrafiltration device [VIVAFLOW 200 (product name) made by Sartorius Corporation, at a condition of a molecular weight fraction of 50,000], to remove free components having low molecular weights in the liquid. The liquid as treated above was diluted with water to adjust its concentration of the solution at 2%. Then, into 50 g of the solution, 3 g of dimethyl sulfoxide was added to obtain a conductive polymer dispersion liquid (I).

Preparation Example of Conductive Polymer Dispersion Liquid (II)

200 g of 3% sulfonated polyester [PLASCOAT Z-561 (product name) manufactured by Goo Chemical Co., Ltd.; weight average molecular weight of 27,000] aqueous solution was put into a beaker with an internal volume of 1 L. 2 g of ammonium persulfate was added there and dissolved by stirring with a stirrer. Then, 0.4 g of 40% aqueous solution of ferric sulfate was added. While stirring, 3,4-ethylenedioxythiophene (3 mL) was dropped slowly there to polymerize the 3,4-ethylenedioxythiophene for 24 hours.

After the polymerization above, the mixture was diluted with 4 times of water in volume. Then, a dispersion treatment was carried out by using an ultrasonic homogenizer [Nippon Seiki Co., Ltd., US-T300 (product name)] for 30 minutes. Then, 100 g of cation exchange resin [AMBERLITE 120B (Product name)] manufactured by Organo Corporation was added, and the mixture was stirred for one hour. After stirring with a stirrer for one hour, filtration was performed by using a filter paper, No. 131 made by Toyo Roshi Kaisha, Ltd. The operations from the dispersion to the filtration described above were repeated three times to remove all the cationic components.

The filtered liquid above was passed through a filter having a pore size of 1 μm. Thereby filtered liquid was treated with an ultrafiltration device [VIVAFLOW 200 (product name) made by Sartorius Corporation, at a condition of a molecular weight fraction of 50,000] to remove free components having low molecular weights. The solution above was diluted with water to adjust its concentration at 5%. Then, into 40 g of the solution, 4 g of dimethyl sulfoxide were added to obtain a conductive polymer dispersion liquid (II).

Example 126

For the capacitor element of the tantalum electrolyte capacitor of Example 126, a tantalum sintered body having been designed to have a rated voltage of 16V, an ESR of 20 mΩ or less, a capacitance of 150 μF or more, and a leak current of 100 μA or less was used.

The capacitor element above was immersed in a monomer solution obtained by adding 80 ml of ethanol into 20 ml of a mixture solution of 3,4-ethylenedioxythiophene and butylated ethylenedioxythiophene at a mass ratio of 4:6. After one minute, it was pulled up and dried at room temperature for 10 minutes. Then, the capacitor element above was immersed in an oxidant dopant agent dilution solution obtained by mixing 500 g of the oxidant dopant agent solution of Example 1 with 500 g of ethanol. After 30 seconds, it was pulled up and left at room temperature for 80 minutes to cause a polymerization to form a conductive polymer layer. Then, the capacitor element having formed the conductive polymer layer was immersed in pure water. After 30 minutes, it was pulled out and dried at 70° C. for 30 minutes. The operation above was repeated four times to form a first electrolyte layer made of a conductive polymer on the capacitor element through the "on-site polymerization" of the monomer mixture of 3,4-ethylenedioxythiophene and butylated ethylenedioxythiophene at a mass ratio of 4:6. In the oxidant dopant agent solution of Example 1 used in the production of the conductive polymer constituting the first electrolyte layer, 5.26% of dibutyl phosphate was contained with respect to the ferric naphthalenesulfonate, as explained before.

Then, the capacitor element having formed the first electrolyte layer mentioned above was immersed in the conductive polymer dispersion liquid (II). After one minute, it was pulled up and dried at 150° C. for 30 minutes. The operation above was repeated three times to form a second electrolyte layer on the first electrolyte layer made by the "on-site polymerization" as mentioned above. The second electrolyte layer was a layer formed by impregnation and dry of the conductive polymer dispersion liquid (II).

Then, the electrolyte layer was covered by carbon paste and silver paste. Then, its outside was surrounded by an exterior material to obtain a tantalum electrolyte capacitor of the Example 126.

Example 127

The same capacitor element as Example 126 was used. In the same manner as Example 126, the same dilution solution of the oxidant dopant agent solution as Example 1 was used. Then, the monomer mixture of 3,4-ethylenedioxythiophene and butylated ethylenedioxythiophene at a mass ratio of 4:6 was polymerized to form a first electrolyte layer made of a conductive polymer on the capacitor element.

Then, the capacitor element above was immersed in the conductive polymer dispersion liquid (I) for 2 minutes, and then it was pulled up, and then it was dried at 150° C. for 30 minutes. The operation above was repeated twice to form a second electrolyte layer on the first electrolyte layer made by the "on-site polymerization" as mentioned above. The second electrolyte layer was a layer formed by impregnation and dry of the conductive polymer dispersion liquid (I) (which is hereinafter referred to as "second electrolyte layer made of the conductive polymer dispersion liquid (I)").

Furthermore, the capacitor element above was immersed in the conductive polymer dispersion liquid (II) for one minute, and then it was taken out, and then it was dried at 150° C. for 30 minutes. Thereby, on the second electrolyte layer made of the conductive polymer dispersion liquid (I), a third electrolyte layer was formed by immersing into the conductive polymer dispersion liquid (II) followed by drying it (which is hereinafter simply referred to as "third electrolyte layer made of the conductive polymer dispersion liquid (II))."

Then, the electrolyte layer was covered by carbon paste and silver paste. Then, its outside was surrounded by an exterior material to obtain a tantalum electrolyte capacitor of the Example 127.

With respect to the tantalum electrolyte capacitors of Examples 126 and 127 (which can be hereinafter simply called as "capacitor"), the ESR, the capacitance and the leakage current were measured in the same manner as described before. The results are shown in Table 6, along with the kinds of the oxidant dopant agent solution used. In addition, the manner to show the ESR, the capacitance, the leak current in Table 6 is the same as described in Table 1.

TABLE 6

|  | Oxidant dopant agent solution | ESR (mΩ) | Capacitance (μF) | Leak current (μA) |
| --- | --- | --- | --- | --- |
| Example 126 | Example 1 | 14.7 | 158 | 9 |
| Example 127 | Example 1 | 14.4 | 156 | 4 |

Also, as shown it Table 6, the capacitors of Examples 126 and 127 had an ESR of 14.4 to 14.7 mΩ, thereby satisfying the set value of the ESR to be 20 mΩ or less; a capacitance of 156 to 158 μF, thereby satisfying the set value of the capacitance to be 150 μF or more; and a leak current of 4 to 9 μA, thereby satisfying the set value of the leak current to be 100 μA or less.

Also, the capacitors of Examples 126 and 127 (tantalum electrolyte capacitor), in the same manner, are compared with the tantalum electrolytic capacitor of Example 31 which used the oxidant dopant agent of the Example 1. The capacitor of Examples 126 and 127 had a leak current lower than the capacitor of Example 31.

That is, the leak current of the capacitor of Example 31 was 18 μA as shown in Table 1, whereas the leak current of the capacitor of Example 126 was 9 μA and the leak current of the capacitor of Example 127 was 4 μA, as shown in Table 6. Namely, the leak current of the capacitors of these Examples 126 and 127 was lower than the leak current of the capacitor of Example 31. It was found that the leak current could be lowered by forming the second electrolyte layer or the second and third electrolyte layers made of the conductive polymer of the π conjugated system conductive polymer dispersion liquid on the first electrolyte layer made of the conductive polymer formed by so-called the "on-site polymerization."

[Evaluation of Winding-Type Aluminum Electrolyte Capacitor (3)]

In the evaluation (3) of the winding-type aluminum solid electrolytic capacitor, the followings were done. An inorganic acid ester type additive such as phosphate or phosphite was mixed with a monomer. The mixture of the monomer and the inorganic acid ester type additive was mixed with an organic ferric sulfonate solution during the manufacturing process of the electrolyte capacitor. In the presence of the monomer, an oxidant dopant agent solution for conductive polymer preparation was constituted by including the organic ferric sulfonate, and the inorganic acid ester type additive such as phosphate or the phosphite, so as to form the oxidant dopant agent solution for conductive polymer preparation of the present invention. By using the oxidant dopant solution for conductive polymer production, the monomer was polymerized to form an electrolyte layer made of a conductive polymer.

Example 128

A surface of an aluminum foil was applied to an etching treatment. Then, the aluminum foil after the etching treatment was immersed in a 12% ammonium aqueous solution. Then, the aluminum foil in the ammonium aqueous solution was applied to a voltage of 75V to form a dielectric layer made of an oxide film of aluminum on the surface of the aluminum foil to serve as a positive electrode. A lead terminal was attached to the positive electrode. Also, a lead terminal was attached to a negative electrode made of an aluminum foil. These positive electrode and negative electrode having lead terminals were wound with an intervention of a separator to manufacture a capacitor element. The capacitor element prepared here was a winding-type aluminum electrolyte capacitor having a set value of the ESR to be 30 mΩ or less, a set value of the capacitance to be 50 μF or more, a setting value of the leak current to be 100 μA or less, and a set value of the breakdown voltage to be 50V or more, also having a cavity volume of the element being 0.1 ml.

Then, into 20 ml of a monomer mixture made by mixing 3,4-ethylenedioxythiophene with butylated ethylenedioxythiophene at a mass ratio 4:6, 4 ml of dibutyl phosphate (4 ml of this dibutyl phosphate was to be 4.24 g at a mass) and 76 ml of ethanol were added to prepare a monomer solution.

Also, 5.7 kg of ferric naphthalenesulfonate (a molar ratio of 1:2.70 for the iron and the naphthalenesulfonic acid) was dissolved to prepare 10 kg of an ethanol solution (1% of water content). Then, 10 kg of the ethanol solution of the ferric naphthalenesulfonate above was put into a reaction vessel having an internal volume of 20 L, into which 1 kg of glycerin diglycidyl ether was added. The contents were heated to reach a temperature of 80° C. A reflux was continued for one hour to prepare an oxidant dopant agent solution.

This oxidant dopant agent solution contained a quantity of the glycerin diglycidyl ether at 17.54% with respect to the ferric naphthalenesulfonate. This oxidant dopant agent solution had the same constitution as the oxidant dopant agent solution of Example 61 except for excluding dibutyl phosphate.

Also, when producing the winding-type aluminum electrolyte capacitor, first the capacitor element was immersed in 100 ml of the monomer solution as prepared above. After 60 seconds, it was pulled up and dried at 50° C. for ten minutes. During the drying, the ethanol could almost dry, so that 24% of the volumes in the capacitor element were satisfied with the monomer and the dibutyl phosphate. In particular, 4% thereof could be occupied by the dibutyl phosphate.

Then, the capacitor element above was immersed in 100 ml of the oxidant dopant agent solution (110 g by mass) which did not include the dibutyl phosphate as prepared. After 20 seconds, it was pulled out. By the operation above, 76% of the volumes inside the capacitor element were filled with the oxidant dopant agent solution. Here, the oxidant dopant agent solution filled inside the capacitor element was 0.076 ml. Since it has a specific gravity is 1.1, the mass of the oxidant dopant agent solution filled inside of the capacitor element was 0.0836 g. From the composition ratio of each of the ingredients in the oxidant dopant agent, the mass of the ferric naphthalenesulfonate was obtained. As a result, the mass of the ferric naphthalenesulfonate filled inside the capacitor element was 0.0433 g. By contrast, the mixture of the monomer and the dibutyl phosphate, which was filled inside the capacitor element, was 0.024 ml. The dibutyl phosphate in 0.024 ml of the mixture of the monomer and the dibutyl phosphate was 0.004 ml. Since the mass of the dibutyl phosphate was 0.00424 g as shown above. In Example 128, the relation between the ferric naphthalenesulfonate and the dibutyl phosphate, which were filled inside the capacitor element, was equivalent to the case in which 9.79% by mass of dibutyl phosphate was added with respect to the ferric naphthalenesulfonate.

Then, it was heated at 70° C. for two hours and then at 180° C. for one hour to polymerize the monomers, thereby forming an electrolyte layer of a conductive polymer having a polymer backbone of a copolymer of 3,4-ethylenedioxythiophene and butylated ethylenedioxythiophene. Then, the outer surface was surrounded by an exterior material to obtain a winding-type aluminum electrolyte capacitor of Example 128.

Example 129

3.9 kg of ferric naphthalenesulfonate (a molar ratio of 1:2.70 for iron versus naphthalenesulfonic acid) was dissolved to prepare 9.32 kg of an ethanol solution (1% of water content).

Then, 0.68 kg of glycerin diglycidyl ether was added into the ethanol solution of the ferric naphthalenesulfonate above. Then, there was heated such that the temperature of the contents reached 80° C., and a reflux was continued for one hour to prepare an oxidant dopant agent solution.

Then, into 20 ml of a monomer mixture made by mixing 3,4-ethylenedioxythiophene with butylated ethylenedioxythiophene at a mass ratio 4:6, 4 ml of diethylhexyl phosphate (this was equivalent to 3.86 g by mass of the diethylhexyl phosphate) and 45 ml of ethanol were added to prepare a monomer solution.

Then, the same capacitor element as Example 128 was immersed in 100 ml of the oxidant dopant agent solution as prepared above for 30 seconds. After it was pulled out, it was dried at 105° C. for 30 minutes. During the drying, the ethanol could almost dry, so that approximately 31% of the volume inside the capacitor element was filled with the mixture of ferric naphthalenesulfonate and glycerin diglycidyl ether that were derived from the oxidant dopant agent solution. Since the mixture of ferric naphthalenesulfonate and glycerin diglycidyl ether had a specific gravity of approximately 1.48, the mass of the mixture of the ferric naphthalenesulfonate and glycerin diglycidyl ether, filled inside the capacitor element, was approximately 0.046 g. From the composition ratio of each ingredient in the mixture of the ferric naphthalenesulfonate and the glycerin diglycidyl ether, it was found that the ferric naphthalenesulfonate filled inside the capacitor element was approximately 0.039 g. Then, the capacitor element above was immersed in 69 ml of the monomer solution including the diethylhexyl phosphate which had prepared as explained before. After 10 seconds, it was pulled out. By the operation above, 69% of the volumes inside the capacitor element were filled with the monomer solution. The monomer solution filled inside the capacitor element in this way was 0.069 ml. From the quantity of the addition of the diethylhexyl phosphate at the time of the preparation of the monomer solution, the volume of the diethylhexyl phosphate occupied in the monomer solution was 0.004 ml. The mass of the diethylhexyl phosphate was 0.00386 g, that to be clear from the above. Therefore, in Example 129, the relation between the ferric naphthalenesulfonate and the diethylhexyl phosphate, which were filled inside the capacitor element, was equivalent to the case in which 9.90% by mass of diethylhexyl phosphate was added with respect to the ferric naphthalenesulfonate.

Then, it was heated at 70° C. for two hours and then at 180° C. for one hour to polymerize the monomers, thereby forming an electrolyte layer of a conductive polymer having a polymer backbone of a copolymer of 3,4-ethylenedioxythiophene and butylated ethylenedioxythiophene. Then, the outer surface was surrounded by an exterior material to obtain a winding-type aluminum electrolyte capacitor of Example 129.

Example 130

Into 20 ml of a monomer mixture made by mixing 3,4-ethylenedioxythiophene with butylated ethylenedioxythiophene at a mass ratio 4:6, 4 ml of diphenyl phosphate (this was equivalent to 3.04 g by mass of diphenyl phosphate) was added to prepare a monomer solution.

24 ml of the monomer solution above was mixed with 76 ml of the oxidant dopant agent solution (83.6 g by mass) same as used in Example 128. The same capacitor element as used in Example 128 was immersed in 100 ml of the mixture solution obtained. After 30 seconds, it was pulled out. By the operation above, 0.076 ml of the oxidant dopant agent solution and 0.024 ml of the monomer solution were filled inside the capacitor element. The mass of 0.076 ml of the oxidant dopant agent solution was 0.0836, that was clear from the above. From the composition ratio of each ingredient of the oxidant dopant agent solution, it was found that the mass of the ferric naphthalenesulfonate filled inside the capacitor element was 0.0433 g. By contrast, 0.024 ml of the monomer solution contained 0.004 ml of diphenyl phosphate. The mass of 0.004 ml of the diphenyl phosphate was 0.00304 g as described above. Therefore, in Example 130, the relation between the ferric naphthalenesulfonate and the diphenyl phosphate, which were filled inside the capacitor element, was equivalent to the case in which 7.02% by mass of diphenyl phosphate was added with respect to the ferric naphthalenesulfonate.

Then, it was heated at 70° C. for two hours and then at 180° C. for one hour to polymerize the monomers, thereby forming an electrolyte layer of a conductive polymer having a polymer backbone of a copolymer of 3,4-ethylenedioxythiophene and butylated ethylenedioxythiophene. Then, the outer surface was surrounded by an exterior material to obtain a winding-type aluminum electrolyte capacitor of Example 130.

Example 131

Except for replacing dibutyl phosphate with dibutyl phosphite, the same procedure as Example 128 was carried out to prepare a winding-type aluminum electrolyte capacitor of Example 131.

Example 132

Except for replacing diethylhexyl phosphate with diethylhexyl phosphite, the same procedure as Example 129 was carried out to prepare a winding-type aluminum electrolyte capacitor of Example 132.

Example 133

Except for replacing diphenyl phosphate with diphenyl phosphite, the same procedure as Example 130 was carried out to prepare a winding-type aluminum electrolyte capacitor of Example 133.

Regarding the winding-type aluminum electrolyte capacitors of Examples 128 to 133 (hereinafter, which can be simply called as "capacitor"), the ESR, the capacitance, the leakage current and the breakdown voltage were measured. The results are shown in Table 7. In addition, the methods for measuring the ESR, the capacitance, the leak current and the breakdown voltage were the same as described before. The manner shown in Table 7 is the same as described in Table 3.

TABLE 7

|  | ESR (mΩ) | Capacitance (μF) | Leak current (μA) | Breakdown voltage (V) |
|---|---|---|---|---|
| Example 128 | 20 | 55 | 9 | 69 |
| Example 129 | 19 | 52 | 5 | 71 |
| Example 130 | 17 | 54 | 6 | 72 |
| Example 131 | 20 | 54 | 10 | 69 |
| Example 132 | 19 | 52 | 6 | 72 |
| Example 133 | 18 | 54 | 5 | 72 |

As shown in Table 7, the capacitors of Examples 128 to 133 had: an ESR of 17 to 20 mΩ, thereby satisfying the set value of the ESR to be 30 mΩ or less; a capacitance of 52 to 55 μF, thereby satisfying the set value of the capacitance to be 50 μF or more; a leak current of 5 to 10 μA, thereby satisfying the set value of the leak current to be 100 μA or less; and a breakdown voltage of 69 to 72V, thereby satisfying the set value of the breakdown voltage of 50V or more. Also, the capacitors of Examples 128 to 133 had a lower leak current and a higher breakdown voltage than the capacitors of Comparative Examples 5 and 6 as shown in Table 4.

[Evaluation of Winding-Type Aluminum Electrolyte Capacitor (4)]

In this evaluation (4) of the winding-type aluminum electrolyte capacitor, a conductive polymer prepared by using the oxidant dopant agent solution for conductive polymer preparation of the present invention was used along with a conductive auxiliary liquid, thereby preparing a winding-type aluminum electrolyte capacitor. Then, its characteristics were evaluated.

First, a preparation example of the conductive auxiliary liquid is explained before explaining the production of the winding-type aluminum electrolyte capacitor.

Preparation Example of Conductive Auxiliary Liquid (1)

Into 500 g of γ-butyrolactone put in an 1 L beaker with a stirrer, 50 g of hydroxybenzene carboxylic acid, 5 g of nitrobenzoic acid (i.e., nitrobenzene carboxylic acid) and 1 g of 3-glycidoxypropyltrimethoxysilane were added. Ethylamine was further added to adjust the pH at 4. After stirring was continued for 24 hours, a conductive auxiliary liquid (1) was obtained.

The conductivity of this conductive auxiliary liquid (1) was measured under a condition of 25° C. by using a conductivity measurement instrument (F-55) manufactured by Horiba, Ltd. The conductivity of this conductive auxiliary liquid was 0.9 mS/cm.

Preparation Example of Conductive Auxiliary Liquid (2)

Into 500 g of ethylene glycol put in an 1 L beaker with a stirrer, 50 g of phthalic acid, 5 g of nitrophenol and 5 g of polyethylene glycol diglycidyl ether were added. Ethylamine was further added to adjust the pH at 6. After stirring was continued for 24 hours, a conductive auxiliary liquid (2) was obtained.

The conductivity of this conductive auxiliary liquid (2) was measured under a condition of 25° C. by using a conductivity measurement instrument (F-55) manufactured by Horiba, Ltd. The conductivity of this conductive auxiliary liquid (2) was 0.5 mS/cm.

Preparation Example of Conductive Auxiliary Liquid (3)

Into 500 g of ethylene glycol put in an 1 L beaker with a stirrer, 50 g of phthalic acid, 5 g of nitrobenzoic acid, 100 g of tributyl phosphate, 2 g of polyethylene glycol 400, and 5 g of polysiloxane were added. Diethylamine was further added therein to adjust the pH at 3. After stirring was continued for 24 hours, a conductive auxiliary liquid (3) was obtained.

The conductivity of this conductive auxiliary liquid (3) was measured under a condition of 25° C. by using a conductivity measurement instrument (F-55) manufactured by Horiba, Ltd. The conductivity of this conductive auxiliary liquid (3) was 0.6 mS/cm.

Example 134

A surface of an aluminum foil was applied to an etching treatment. Then, the aluminum foil after the etching treatment was immersed in a 12% ammonium aqueous solution. Then, the aluminum foil in the ammonium aqueous solution was applied to a voltage of 130V to form a dielectric layer made of an oxide film of aluminum on the surface of the aluminum foil to serve as a positive electrode. A lead terminal was attached to the positive electrode. Also, a lead terminal was attached to a negative electrode made of an aluminum foil. These positive electrode and negative electrode having lead terminals were wound with an intervention of a separator to manufacture a capacitor element. The capacitor element prepared here was a winding-type aluminum electrolyte capacitor having a set value of the ESR to be 30 mΩ or less, a set value of the capacitance to be 30 μF or more, a setting value of the leak current to be 100 μA or less, and a set value of the breakdown voltage to be 65V or more.

The capacitor element above was immersed in a monomer solution obtained by adding 70 ml of ethanol into 30 ml of a mixture solution of 3,4-ethylenedioxythiophene and butylated ethylenedioxythiophene at a mass ratio of 4:6. Then, it was pulled up and dried at 50° C. for 10 minutes. Then, the capacitor element above was immersed in 100 ml of the oxidant dopant agent solution of Example 61. After pulling it up, it was heated at 50° C. for 30 hours and then at 180° C. for one hour to polymerize the monomers, thereby forming an electrolyte layer of a conductive polymer having a polymer backbone of a copolymer of 3,4-ethylenedioxythiophene and butylated ethylenedioxythiophene. Then, the capacitor element above was immersed in the conductive auxiliary liquid (1), followed by pulling it out. Then, the outer surface was surrounded by an exterior material to obtain a winding-type aluminum electrolyte capacitor of Example 134.

Example 135

The conductive auxiliary liquid (1) was replaced with the conductive auxiliary liquid prepared (2). Other than the replacement above, the same procedure as Example 134 was carried out to produce winding-type aluminum electrolyte capacitor of Example 135.

Example 136

The conductive auxiliary liquid (1) was replaced with the conductive auxiliary liquid prepared (3). Other than the replacement above, the same procedure as Example 134 was carried out to produce winding-type aluminum electrolyte capacitor of Example 136.

Example 137

Except for replacing the oxidant dopant agent solution of Example 61 with the oxidant dopant agent solutions of Example 66, the same procedure as Example 134 was carried out to prepare a winding-type aluminum electrolyte capacitor of Example 137.

Example 138

The conductive auxiliary liquid (1) was replaced with the conductive auxiliary liquid prepared (2). Other than the replacement above, the same procedure as Example 137 was carried out to produce a winding-type aluminum electrolyte capacitor of Example 138.

Example 139

The conductive auxiliary liquid (1) was replaced with the conductive auxiliary liquid prepared (3). Other than the replacement above, the same procedure as Example 137 was carried out to produce winding-type aluminum electrolyte capacitor of Example 139.

Comparative Example 9

100 ml of the oxidant dopant agent solution of Example 61 was replaced with 100 ml of the oxidant dopant agent solution of Comparative Example 3. In addition, the process of immersing in the conductive auxiliary liquid (1) was not carried out. Other than the changes noted here, the same procedure as Example 134 was carried out to produce a winding-type aluminum electrolyte capacitor of Comparative Example 9.

Comparative Example 10

100 ml of the oxidant dopant agent solution of Example 61 was replaced with 100 ml of the oxidant dopant agent solution of Comparative Example 4. In addition, the process of immersing in the conductive auxiliary liquid (1) was not carried out. Other than the changes noted here, the same procedure as Example 134 was carried out to produce a winding-type aluminum electrolyte capacitor of Comparative Example 10.

Regarding the winding-type aluminum electrolyte capacitors of Examples 134 to 139 and Comparative Examples 9 and 10 (hereinafter, which can be simply called as "capacitor"), the ESR, the capacitance, the leakage current and the breakdown voltage were measured, in the same manner as described before. The results are shown in Table 8 in the same manner as Table 3.

TABLE 8

| | ESR (mΩ) | Capacitance (μF) | Leak current (μA) | Breakdown voltage (V) |
|---|---|---|---|---|
| Example 134 | 22 | 34 | 2 | 103 |
| Example 135 | 21 | 34 | 2 | 100 |
| Example 136 | 21 | 35 | 1 | 102 |
| Example 137 | 23 | 34 | 1 | 104 |
| Example 138 | 22 | 35 | 1 | 103 |
| Example 139 | 22 | 34 | 1 | 104 |
| Comp. Ex. 9 | 23 | 27 | 1092 | 42 |
| Comp. Ex. 10 | 27 | 32 | 880 | 55 |

As shown in Table 8, the capacitors of Examples 134 to 139 each had: an ESR of 21 to 23 mΩ, thereby satisfying the set value of the ESR to be 30 mΩ or less; a capacitance of 34 to 35 μF, thereby satisfying the set value of the capacitance to be 30 μF or more; a leak current of 1 to 2 μA, thereby satisfying the set value of the leak current to be 100 μA or less; and a breakdown voltage of 100 to 104V, thereby satisfying the set value of the breakdown voltage of 65V or more. In addition, these capacitors had a lower leak current than the capacitors of Comparative Examples 9 and 10.

INDUSTRIAL UTILITY

According to the present invention, there can be provided an oxidant dopant agent for conductive polymer production, and a solution thereof, in which they are capable of producing a conductive polymer suitable in producing an electrolyte capacitor having a low leak current. In addition, there can be provided a conductive polymer prepared by using either of them, in which the conductive polymer is suitable in producing an electrolyte capacitor having a low leak current. Also, there can be provided an electrolyte capacitor using the conductive polymer as an electrolyte, in which the electrolyte capacitor has a low leak current.

What is claimed is:

1. A method for preparing an electrolyte capacitor, comprising:
    providing an oxidant dopant agent for preparing a conductive polymer comprising:
        ferric naphthalenesulfonate; and
        at least one compound selected from the group consisting of phosphate, phosphite, borate, thiophosphate, and dithiophosphate:
    providing a capacitor element;
    providing a monomer;
    applying the monomer and the oxidant dopant agent on the capacitor element and polymerizing to obtain a conductive polymer on the capacitor element;
    providing an exterior material outside the conductive polymer, wherein the conductive polymer serves as an electrolyte of the electrolyte capacitor.

2. The method according to claim 1, further comprising preparing another conductive polymer on the conductive polymer before providing the exterior material, wherein said another conductive polymer is formed from a dispersion liquid of a π conjugated system conductive polymer including a polymer anion as a dopant.

3. The method according to claim 1, further comprising providing a conductive auxiliary liquid inside the electrolyte capacitor, wherein the conductive auxiliary liquid comprises:
   a high boiling point organic solvent having a boiling point of 150° C. or more; or
   a high boiling point organic solvent having a boiling point of 150° C. or more, and an aromatic compound having at least one hydroxyl group or carboxyl group.

4. The method according to claim 1, wherein the monomer and the oxidant dopant agent are mixed in advance, which is applied on the capacitor element to prepare the conductive polymer on the capacitor element.

5. The method according to claim 1, wherein the oxidant dopant agent is provided as an organic solution thereof.

6. The method according to claim 1, wherein the monomer is provided as an organic solution thereof,
   wherein the organic solution of the monomer and the oxidant dopant agent are alternatively applied on the capacitor element to prepare the conductive polymer on the capacitor element.

7. The method according to claim 1, wherein the oxidant dopant agent further comprises a glycidyl group containing compound or its ring-opening compound.

8. The method according to claim 1, wherein the ferric naphthalenesulfonate has a molar ratio of iron to an organic sulfonic acid, wherein the molar ratio is lower than 1:3 in view of the organic sulfonic acid.

9. The method according to claim 1, wherein said at least one compound is contained at an amount of 1 to 100% by mass standard with respect to the ferric naphthalenesulfonate.

10. The method according to claim 1, wherein the conductive polymer obtained by using the oxidant dopant agent serves as an electrolyte of an electrolyte capacitor having a leak current of 100 μA or less.

11. The method according to claim 1, wherein the conductive polymer obtained by using the oxidant dopant agent serves as an electrolyte of an electrolyte capacitor having an ESR of 30 mΩ or less.

* * * * *